(12) United States Patent
Kulick, III et al.

(10) Patent No.: US 11,543,192 B2
(45) Date of Patent: Jan. 3, 2023

(54) COOLING TOWER SPLASH BAR AND RELATED ASSEMBLY

(71) Applicant: Brentwood Industries, Inc., Reading, PA (US)

(72) Inventors: Frank M. Kulick, III, Reading, PA (US); Christopher Bowman, Reading, PA (US); Nicholas Gavenas, Reading, PA (US)

(73) Assignee: BRENTWOOD INDUSTRIES, INC., Reading, PA (US)

(*) Notice: Subject to any disclaimer, the term of this patent is extended or adjusted under 35 U.S.C. 154(b) by 0 days.

(21) Appl. No.: 17/622,326

(22) PCT Filed: Jul. 15, 2019

(86) PCT No.: PCT/US2019/041798
§ 371 (c)(1),
(2) Date: Dec. 23, 2021

(87) PCT Pub. No.: WO2021/002877
PCT Pub. Date: Jan. 7, 2021

(65) Prior Publication Data
US 2022/0205744 A1    Jun. 30, 2022

Related U.S. Application Data

(60) Provisional application No. 62/869,724, filed on Jul. 2, 2019.

(51) Int. Cl.
*F28F 25/08*    (2006.01)

(52) U.S. Cl.
CPC ............................ *F28F 25/082* (2013.01)

(58) Field of Classification Search
CPC ........................................... F28F 25/082
(Continued)

(56) References Cited

U.S. PATENT DOCUMENTS 2,634,959 A    4/1953    Cave
2,780,306 A    2/1957    Boyle et al.
(Continued)

FOREIGN PATENT DOCUMENTS

AU    2012200664 A1    3/2012
CN    204373449 U      6/2015
(Continued)

OTHER PUBLICATIONS

Office Action dated Apr. 25, 2022 in Chinese Application No. 201980098193.
(Continued)

*Primary Examiner* — Charles S Bushey
(74) *Attorney, Agent, or Firm* — Panitch Schwarze Belisario & Nadel LLP

(57) ABSTRACT

A splash bar for mounting to a splash bar hanger in a cooling tower includes a first leg defining a longitudinal axis of the splash bar and openings defined through the first leg. The first leg having an outer surface. The outer surface including surface features thereon. The surface features extending at least one of at an acute angle and generally perpendicularly relative to the longitudinal axis. The surface features designed and configured to promote droplet and cooling medium jet formation during operation of the cooling tower.

20 Claims, 11 Drawing Sheets

(58) Field of Classification Search
USPC .......................................................... 261/111
See application file for complete search history.

(56) References Cited

U.S. PATENT DOCUMENTS

| | | |
|---|---|---|
| 3,010,706 A | 11/1961 | McWilliams |
| 3,346,246 A | 10/1967 | Loetel et al. |
| 3,389,895 A | 6/1968 | Flon |
| 3,410,057 A | 11/1968 | Lerner |
| 3,468,521 A | 9/1969 | Furlong et al. |
| 3,647,191 A | 3/1972 | Fordyce |
| 3,749,381 A | 7/1973 | Furlong et al. |
| 3,791,634 A | 2/1974 | Phelps |
| 3,894,127 A | 7/1975 | Fordyce |
| 3,969,447 A | 7/1976 | Glitsch et al. |
| 4,020,130 A | 4/1977 | Ovard |
| 4,052,491 A | 10/1977 | Lefevre |
| 4,105,724 A | 8/1978 | Talbot |
| 4,115,484 A | 9/1978 | Saxton |
| 4,133,851 A | 1/1979 | Ovard |
| 4,178,333 A | 12/1979 | Shepherd |
| 4,269,795 A | 5/1981 | Bosman |
| 4,276,242 A | 6/1981 | Chen et al. |
| 4,439,378 A | 3/1984 | Ovard |
| 4,481,154 A | 11/1984 | Gough et al. |
| 4,515,735 A | 5/1985 | Phelps |
| 4,557,878 A | 12/1985 | Fulkerson |
| 4,562,015 A | 12/1985 | Lefevre |
| 4,575,435 A | 3/1986 | Kuhl |
| 4,576,764 A | 3/1986 | Shepherd et al. |
| 4,578,227 A | 3/1986 | Ovard |
| 4,604,247 A | 8/1986 | Chen et al. |
| 4,676,934 A | 6/1987 | Seah |
| 4,705,653 A | 11/1987 | Stackhouse et al. |
| 4,762,650 A | 8/1988 | Bosman |
| 4,803,018 A | 2/1989 | Lefevre et al. |
| 4,879,084 A | 11/1989 | Parnigoni |
| 4,915,877 A | 4/1990 | Shepherd |
| 4,985,182 A | 1/1991 | Basse et al. |
| 5,104,588 A | 4/1992 | Kinney, Jr. |
| 5,112,537 A | 5/1992 | Kinney, Jr. |
| 5,185,105 A | 2/1993 | Peterson |
| 5,279,774 A | 1/1994 | Remy et al. |
| 5,372,752 A | 12/1994 | Bosman |
| 5,374,381 A | 12/1994 | Schuld et al. |
| 5,454,987 A | 10/1995 | Cornwell, Jr. |
| 5,460,755 A * | 10/1995 | Bosman ................ F28F 25/085 261/106 |
| 5,461,761 A | 10/1995 | Knopfli et al. |
| 6,083,441 A | 7/2000 | Ptaschek et al. |
| 6,293,527 B1 | 9/2001 | Ovard |
| 6,511,053 B2 | 1/2003 | Kaibel et al. |
| 6,708,960 B2 | 3/2004 | Olson et al. |
| 6,877,727 B2 | 4/2005 | Olson et al. |
| 7,559,541 B2 | 7/2009 | Beltz et al. |
| 7,618,026 B2 | 11/2009 | Armstrong |
| 7,669,838 B2 | 3/2010 | North |
| 8,020,837 B2 | 9/2011 | Byrne, Jr. |
| 8,827,248 B2 | 9/2014 | Short |
| 8,926,305 B2 | 1/2015 | Kuchar et al. |
| 8,960,259 B2 | 2/2015 | Weston |
| 9,291,395 B2 | 3/2016 | Roth |
| 9,546,830 B2 | 1/2017 | Krell et al. |
| D843,600 S | 3/2019 | Schmidt et al. |
| 10,408,541 B2 * | 9/2019 | Seawell ................ F28C 1/14 |
| 11,359,876 B2 * | 6/2022 | Kulick, III ............ F28F 25/082 |
| 2005/0051916 A1 | 3/2005 | Kinder et al. |
| 2007/0045879 A1 | 3/2007 | Armstrong |
| 2009/0174090 A1 | 7/2009 | Byrne, Jr. |
| 2015/0014869 A1 | 1/2015 | Roth |
| 2015/0130094 A1 | 5/2015 | Powell |
| 2018/0216902 A1 | 8/2018 | Schmidt et al. |
| 2019/0024993 A1 | 1/2019 | Tobin et al. |

FOREIGN PATENT DOCUMENTS

| | | |
|---|---|---|
| CN | 207379316 U | 5/2018 |
| EP | 0899532 A1 | 3/1999 |
| EP | 1731220 B1 | 8/2008 |
| EP | 2181833 A1 | 5/2010 |
| GB | 1363416 A | 8/1974 |
| IN | 243837 | 1/2009 |
| JP | S48006650 U | 1/1973 |
| NZ | 575963 A | 3/2011 |
| RU | 2243467 C2 | 12/2004 |

OTHER PUBLICATIONS

International Search Report and Written Opinion for PCT/2019/041798 dated Oct. 3, 2019.
International Preliminary Report on Patentability for PCT/US2019/041798 dated Jun. 21, 2021.
Office Action dated Jul. 26, 2022 in Japanese Application No. 2022-500112.
Office Action dated Jun. 30, 2022 in Canadian Application No. 3143671.

* cited by examiner

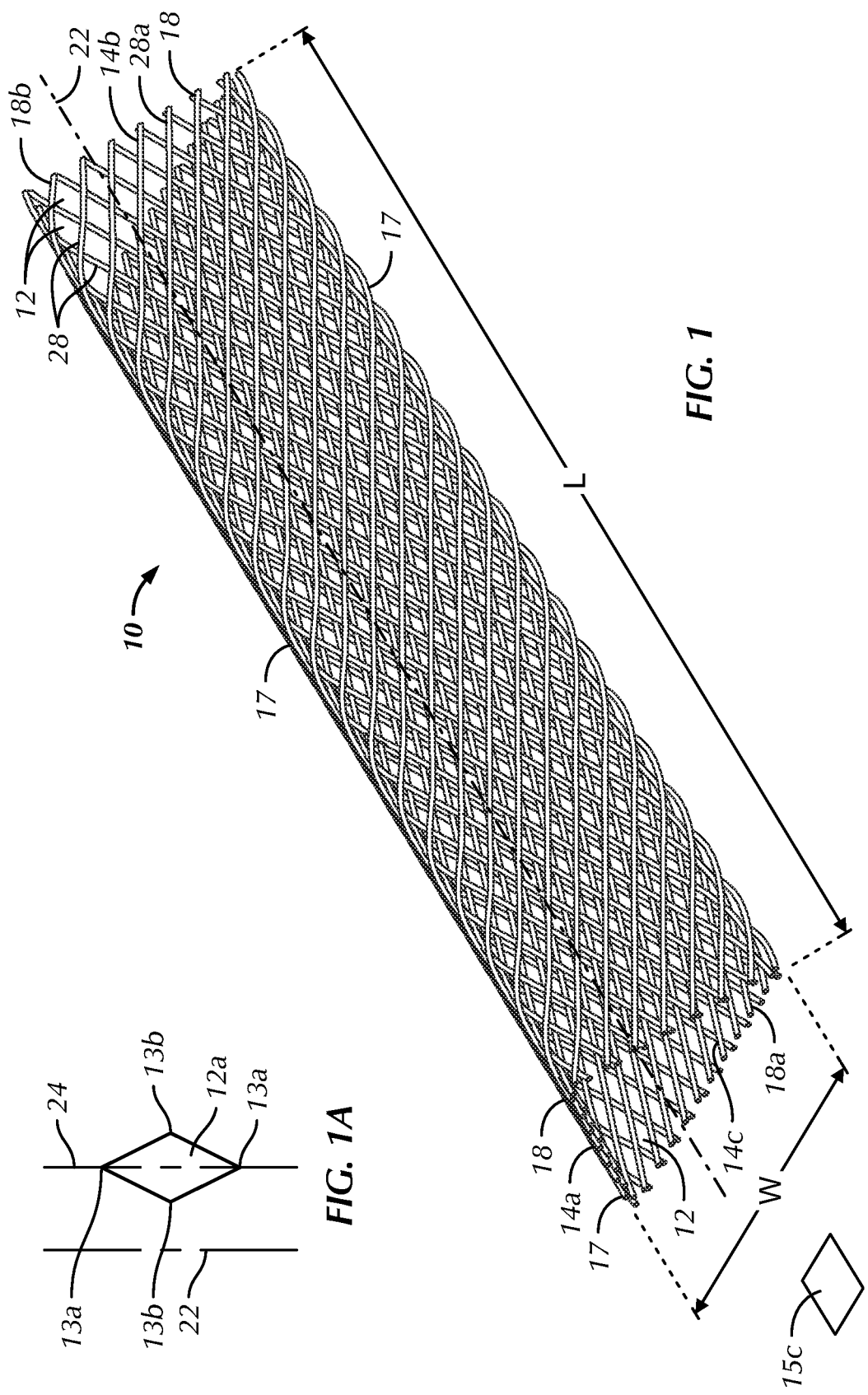

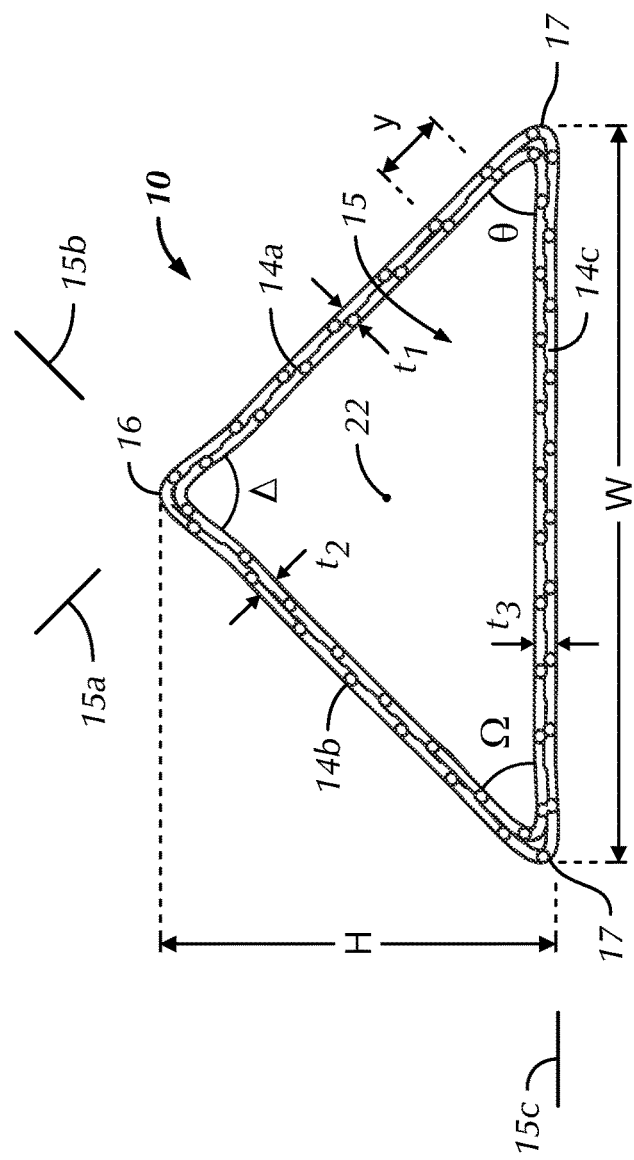
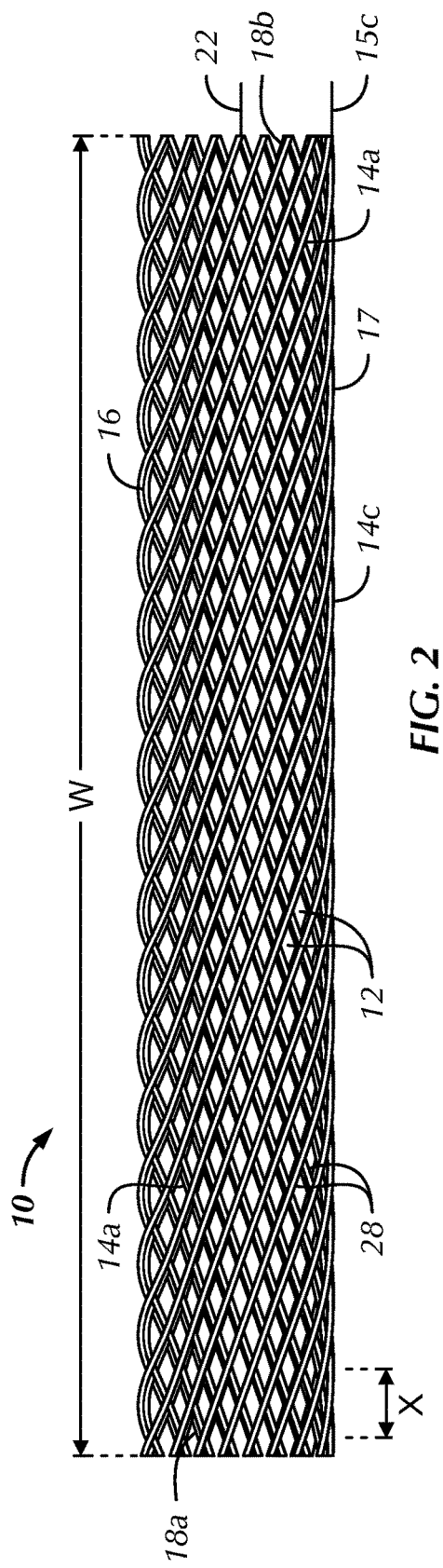

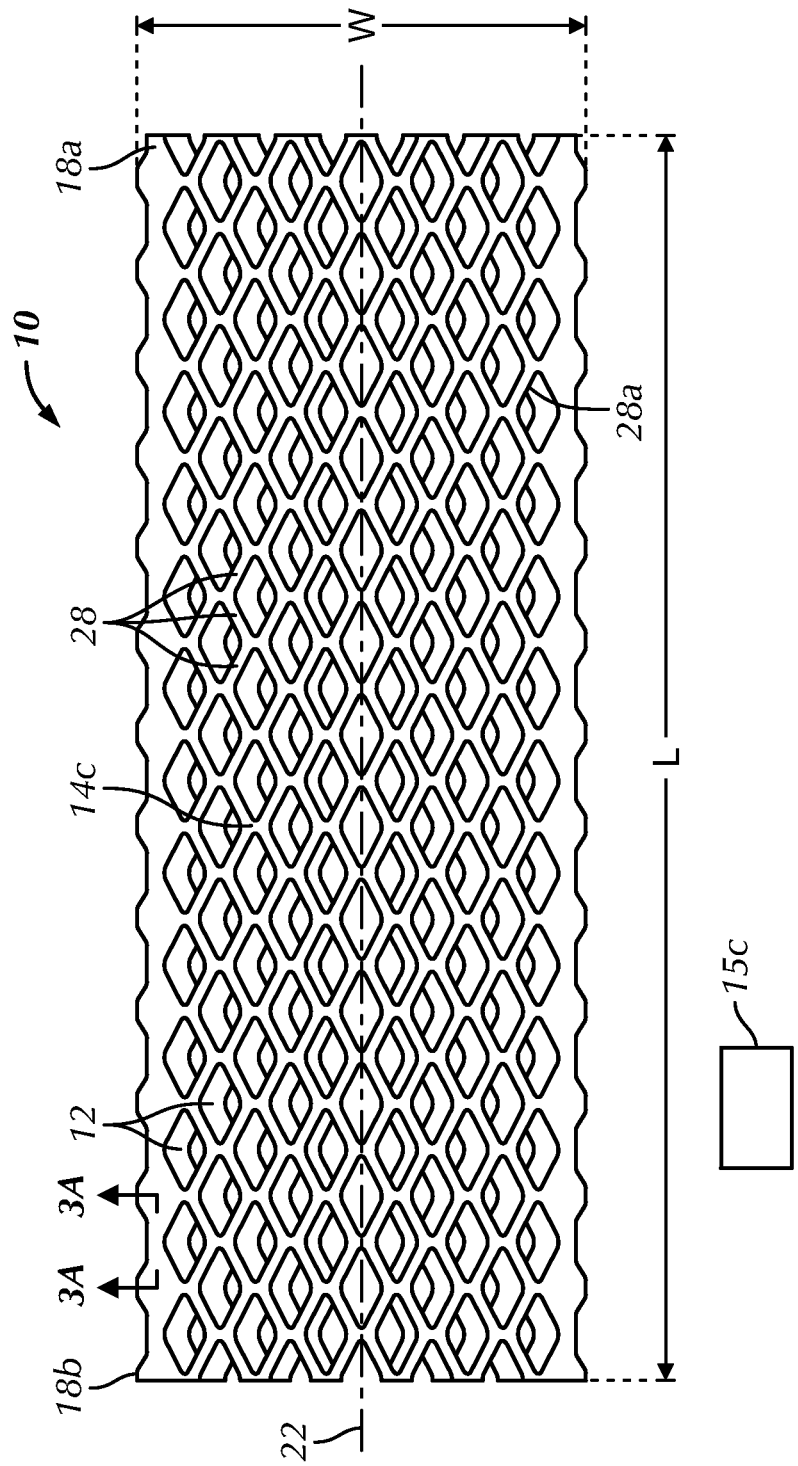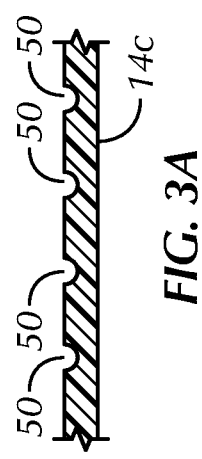
FIG. 3A
FIG. 3

COOLING TOWER SPLASH BAR AND RELATED ASSEMBLY

CROSS REFERENCE TO RELATED APPLICATIONS

The present application is a Section 371 national phase application of International Patent Application No. PCT/US2019/041798, filed Jul. 15, 2019 and titled, "Cooling Tower Splash Bar and Related Assembly" and claims the benefit of U.S. Provisional Patent Application No. 62/869,724 filed on Jul. 2, 2019 and titled, "Cooling Tower Splash Bar and Related Assembly" the entire contents of which are incorporated herein by reference in their entirety.

BACKGROUND OF THE INVENTION

Cooling towers are open loop direct contact evaporative heat exchangers used to provide a heat sink, which is air, for a wide variety of waste heat applications. Hot process water is delivered to the cooling tower via nozzles at a top portion of the cooling tower. The water from the nozzles is distributed and cascades over media beneath the nozzles and within the cooling tower. The media is typically described as "fill," which provides surface area for exposure of the hot process water or other heat transfer medium and a structure for mass transfer to remove heat from the water via air flowing through the medium. Air delivery is typically through natural draft or forced ventilation that flows through the heat transfer medium or fill. Depending on the direction of air flow through the cooling tower with respect to the cooling liquid, typically water, the cooling tower may be concurrent (air and water flow in the same downward direction), which is rare due to less turbulent interaction of the air and water, counter-current (water flows downwardly and air flows upwardly), or cross-flow (water flows downwardly and air flows sideways through the medium).

The tower fill utilized in the cooling tower typically depends upon the tower application, which varies widely based on many factors. For instance, a splash fill may be used for applications where the water source contains strongly polluted, dirty water, water with solid impurities or any cooling fluid where fouling is expected during use. A number of variations exist for tower fill, including splash fill that relies on the impact of falling water on a surface to provide relatively small water droplets of high surface area to volume ratios. Fill surface area also contributes to the mass transfer capacity of the fill. Splash bars are a variation of splash fill that requires a support system to position the splash bars at predetermined locations in the cooling tower for proper operation. Splash bars are typically longitudinal bars or beams that span structural support members within the cooling tower where the spacing between supports of a typical cooling tower is approximately two feet to four feet (2-4'). Splash bars themselves vary in length and shape, but may include bars having a length of approximately eighteen feet (18') and a width of approximately two to six inches (2-6") for ease of installation in a typical cooling tower.

The splash bars are generally offset both vertically and horizontally by grids that support the splash bars so that water droplets from a water distribution system above the fill fall vertically from near the top of the cooling tower onto the splash bars. The falling water droplets strike the splash bars below the water distribution system, but may also fall between splash bars that are laterally separated by support structure of the cooling tower or those that are misaligned during installation. The hot cooling medium or hot water falls onto top level splash bars and also onto lower level splash bars as droplets from higher splash bars descend through the array of splash bars. Large water droplets are generally broken into smaller water droplets upon striking one of the splash bars. As many water droplets strike the splash bars, a thin film of water tends to form on each splash bar in the cooling tower and the surface area of the thin film of water is exposed to air flowing through the splash bar array, thereby resulting in evaporative cooling. The film of water is also the source of the formation of large droplet on the underside of the splash bars. These droplets break from the surface when the droplet achieves a sufficient size such that the droplet cannot be retained on the surface of the splash bar.

Referring to FIGS. 1PA-3PA, typical prior art splash bar support grids 1, which may be referred to as hanger grids 1, include a mesh of perpendicular members or wires, including vertical suspension members 2 and horizontal beams 3, that are typically spaced at fixed dimensions of four inches (4") horizontally and four to twelve inches (4-12") vertically to form rectangular windows within which the splash bars 5 are supported on the horizontal beams 3. The horizontal beams 3, therefore, are typically spaced about four to twelve inches (4-12") vertically relative to each other and the vertical support members 2 are typically spaced about four inches (4") horizontally relative to each other. The horizontal beams 3 may have four inch (4") vertical spacing (FIG. 1PA) and a top horizontal beam 3 may be installed at the top of a cooling tower (near the fan in the case of a mechanical-draft tower) to prevent excessive localized air velocities and preferably create an even pressure drop throughout the cooling tower. The horizontal beams 3 having an eight inch (8") vertical spacing (FIG. 2PA) may be installed with a top horizontal beam 3 toward the middle of the cooling tower, with the fan and water distribution system above the top horizontal beam 3, and the bottom of the cooling tower. The hanger grids 1 formed by the mesh are generally two to four feet (2-4') in width and four, six, eight, ten or twelve feet (4-12') in height. The hanger grids 1 can be sized to fit within a fill section where air and water interact within cooling towers of various designs and dimensions.

Splash bars 5 are typically supported by one of several methods. A first method may utilize the prior art hanger grids 1 with the horizontal beams 3 and vertical suspension members 2 that are spot welded at the crossing points and treated for corrosion resistance. One treated version uses a dipped plastic coating covering hot-dipped galvanized steel wire; however, the vibration and movement of the splash bars 5 within the tower from air flow may cause localized wearing of the coating at contact points between the grid 1 and the splash bars 5, thereby exposing the wire 2, 3 to corrosion and ultimately failure of the wire 2, 3. Most grids 1, including the wires 2, 3, are welded from hot dipped galvanized wire 2, 3 exposing the steel. These welded panels or grids 1 are then coated with polyvinyl chloride ("PVC") resin, which becomes the only feature for preventing corrosion of the wires 2, 3. The exposed wire 2, 3 combined with chemical treatment erodes the zinc coating leading to a similar local degradation of the material and associated failure mechanism. Stainless steel wire mesh or grids 1 may also be used.

Plastic injection molded grids 1 are used to provide a similar spacing arrangement and typically have an integrated connection feature (not shown) that is utilized to attach or secure the splash bars 5 to the grid 1. The integrated connection features are molded into either the vertical suspension members 2 or the horizontal beams 3. The plastic grids 1 are generally molded as a single unit of and may have a width of two to four feet (2-4') and a height of four to eight feet (4-8'). The plastic grids 1 may also be constructed as smaller components and assembled into wider and taller assembled grids 1. The longer lengths are achieved by connecting multiple plastic panels together with tie wire or hog rings. The plastic grids 1 tend to fail at areas of high stress near the top of the splash grid hanger as the load from the lower levels is additive upwardly on the grid 1 toward the upper connection to the cooling tower structure. As the load increases, the stress in the vertical suspension members 2 of the grid 1 also increases. The material properties may be exceeded locally near the top of the grids 1 as the stress surpasses the ultimate strength of the material at the design cross-section. The current plastic products attach via holes in the vertical suspension members 2, which may concentrate stress at these locations of reduced cross-section and, therefore, further reduce the strength of the product.

Typical splash bars 5 may be slightly greater in width than the lateral spacing of the vertical suspension member 2 of support grids 1 to eliminate bypass of the cascading water or flow of the water past the splash bars 5 without impacting the splash bars 5. As a result, the splash bars 5 must be rotated on edge for insertion into the hanger grids 1 and may also be rotated for insertion to avoid the pre-molded connection features. Notches punched into one or both edges of the splash bars 5 allow the splash bar 5 to lay flat on the horizontal beams 3 of the hanger grid 1 while encompassing the vertical suspension members 2 of the hanger grid 1. Installation and retention of the splash bars 5 on the horizontal beams 3 is difficult for a technician, because of the required rotation of the splash bars 5 and urging through the relatively small and narrow grid holes during installation. In addition, installation is difficult because a distal end of the splash bar 5 is spaced from the technician and is not visible to the technician or easy to manipulate during installation. The process of rotating the splash bars 5 in the narrow windows of the hanger grids 1 during installation complicates and increases the time required for installation. In addition, improper installation or placement of the splash bars 5, typically from improper placement of distal ends of the splash bars 5 in the distal grid 1, may create vertical voids within the fill section that permits water to bypass the splash bars 5 and fall under gravity directly into a basin below the splash bars 5. Bypass of the cooling medium past the splash bars 5 and directly into the lower basin is undesirable, as the cooling medium that bypasses the splash bars 5 directly from the water distribution system may have nearly the same temperature at inlet and when the cooling medium falls into the basin, thereby increasing the temperature of the basin cooling medium. Specifically, any gaps that are created within the cooling tower due to installation errors of the splash bars 5 or otherwise is undesirable. Horizontal gaps defined in the grid of splash bars 5 mounted to the hanger grids 1 can result in falling water that is continuous from the top of the installed bars 5 to the bottom of the grid of splash bars 5 into the basin. When a slot is defined in the sides of the splash bars 5 to accommodate the vertical suspension members 2 and reduce any gaps in the grid of splash bars 5, the slot interferes with the installation of the bars 5 where the wires of the vertical suspension members 2 gets caught in the slots in the splash bar 5 as it is inserted into the openings, potentially due to awkward or insufficient rotation or orientation of the splash bars 5 during installation by the technician.

The splash bars 5 typically have a horizontal width of approximately four inches (4") and are generally placed in a four by eight (4×8) (FIG. 1PA) spacing or arrangement in a cooling tower. The splash bars 5 may also be positioned in eight by eight (8×8) (FIG. 2PA) or twelve by eight (12×8) (FIG. 3PA) arrangements or other arrangements in the cooling tower, depending on the configuration of the cooling tower. The prior art grids 1 and splash bars 5 are generally shown as having four inch (4") widths, but are also constructed having two inch (2") widths. In the case of the four by four (4×4) spacing, the splash bars 5 are typically placed in every other opening horizontally and vertically in the hanger grid 1, wherein the vertical suspension members 2 and the horizontal beams 3 are spaced at four inch (4") intervals from each other. For four by eight (4×8) spacing, the bars 5 are typically placed in every other opening horizontally, but are typically placed in every third opening vertically for the same four by four (4×4) spaced wire. For wire with the four by eight (4×8) spacing, the bars 5 are typically placed in every other opening to achieve the desired offset arrangement. These splash bar arrangements set the spacing to be horizontally offset; however, the vertical suspension members 2 of the hanger grid 1 may interfere with the splash bars 5 and either slots are cut into the edge or the splash bars 5, resulting in horizontal overlap of adjacent splash bars 5 or a gap may be defined between adjacent splash bars 5 at the vertical suspension members 2, thereby allowing for cooling medium bypass of the bars 5 and a lack of redistribution and splashing across the "opening." The hanger grids 1, as is shown in FIGS. 1PA-3PA, may be configured with the vertical suspension members 2 and horizontal beams 3 spaced to define a four by four (4×4) (FIG. 1PA) grid, a four by eight (4×8) (FIG. 2PA) grid or a four by twelve (4×12) (FIG. 3PA) grid, which facilitates different spacing and positioning of the splash bars 5 and the splash bars 5 may be positioned in the four by four (4×4) hanger grid 1 in the 4×8 Arrangement, the 8×8 Arrangement or the 12×8 Arrangement, as is shown in FIGS. 1PA-3PA. The slots in the bars 5 may interfere with the installation of the bars 5 (called punching) where the wire 2, 3 gets caught in one of the slots in the splash bar 5 as it is inserted into the openings in the grids 1 prior to being positioned in the proper assembled position.

When using wire support grids, the splash bars are typically held in place within the windows of the hanger grids 1 by external clips or large staples, generally termed "hog rings." Polymer fill support grids utilize opposing clips integrally molded into the grid. The method of attachment assists with maintaining the splash bars in position and can have an impact on cost due to manpower required to attach the splash bars to the support or grids 1 at every grid location. Commonly, the grids 1 are installed sequentially up to the length of the splash bar. Access to the grids 1 and splash bars is typically difficult from the sides and at the grids 1 that are opposite the insertion side of the fill material. The splash bars are typically inserted from one end and clipped or stapled at the end of the splash bar where the installer has access to the splash bar and the grid 1. This leaves unattached ends of the splash bar at the opposite side of the fill to move freely within the windows of the opposite side grid 1 and may result in the splash bars moving under the force of the lateral and vertical air flow required for mass transfer, vibrations created during operation of the cooling tower, forces created by the cascading cooling medium or any force that may move the unattached or unsecured ends of the splash bars. This splash bar movement is undesirable, as misalignment and misplacement may create bypass windows in the fill material and increase the temperature of the basin cooling medium. In cases where access is available to both sides of the splash bars, increased manpower is used to clip the splash bars at both end grids 1.

Two methods are typically employed to secure the hanger grids 1 to the cooling tower structure. A first method utilizes the wire mesh support grids 1, wherein a separate bracket is first fastened to the existing cooling tower support structure using screws or nails. The wire hanger grid 1 is then hung from the bracket, typically by the top horizontal beam 3. The load of multiple panels connected together is then applied to the grid 1 and at spot welds of the top horizontal beam 3, which may result in failure of the welds in overload conditions. These failures may be exacerbated in cold climates where ice may form on the hanger grids 1 and splash bars in winter or at any time during relatively cold ambient conditions. Injection molded plastic hangers or grids 1 typically feature nail or screw holes in either the top horizontal beams 3 or near the top of the vertical suspension members 2. The same principle of accumulated load of multiple connected panels also applies to the plastic panels or grids 1, which may result in the load surpassing the ultimate strength of the plastic vertical suspension members 2 in unexpected overload conditions.

The prior art splash bars 5 have three significant limitations in addition to the difficulty of installing the splash bars 5, including (1) a limited ability to span any significant length between adjacent grids 1 because of their tendency to sag in their center under their own weight and cooling medium loads, (2) direct flow paths on the surfaces of the splash bars 5 along the length of the bars 5 that create direct flow paths for the cooling medium to drift toward an air outlet of the fill and (3) relatively smooth surfaces on the bars 5 that also permit flow of the cooling medium toward the fill outlet under forced air loading. The prior art splash bars 5 are typically relatively thin, thereby having low stiffness that results in sagging of the bars 5 near their midspan creating undesirable cooling medium pooling near the midspan and reduced efficiency, particularly when the bars 5 are utilized in applications where the bars 5 have a relatively long length. The forced air in the splash bar cooling towers also typically flows along the lengths of the splash bars 5 in the assembled configuration in the cooling tower. This forced air along the length of the installed splash bars 5 urges the cooling medium toward the distal end of the splash bars 5 or toward the fill outlet. Cooling medium that is urged off of the distal ends of the splash bars 5 reduces efficiency of the cooling tower, as this cooling medium falls directly into the basin or out of the system with the air flow. The surfaces of the prior art splash bars 5 exacerbate this cooling medium drift by having smooth surfaces and direct flow paths along the length of the splash bars 5 without any obstructions to divert the longitudinal flow of the cooling medium or reduce the flow velocity toward the outlet or distal ends of the splash bars 5.

The foregoing deficiencies and limitations associated with the prior art hanger grids, splash bars and their assembly are addressed and remedied by the various aspects and preferred embodiment of the splash bars encompassed by the present invention, including wire hanger grids for supporting splash bars in a cooling tower and splash bars adapted for use with specific preferred embodiments of the composite hanger grids, assemblies of the composite hanger grids with their supported splash bars, a method of assembling the composite hanger grids and a method of assembling an evaporative cooler fill assembly, including hanger grids and splash bars, in a cooling tower. The preferred splash bars also address the deficiencies and limitations of the prior art splash bars by increasing stiffness and limiting drift.

BRIEF SUMMARY OF THE INVENTION

Briefly stated, the preferred invention is directed to a splash bar for a cooling tower. The splash bar and associated hanger grids, components, and assemblies thereof may be used with any of the concurrent, counter-current or cross-flow style cooling towers, preferably with counter-current and cross-flow cooling towers.

In another aspect, the preferred invention is directed to a splash bar for mounting to a splash bar hanger in a cooling tower. The splash bar includes a first leg defining a first leg plane, a second leg extending from the first leg, a third leg having an outer surface and defining a third leg plane and openings defined in the first, second and third legs. The second leg defines a second leg plane and the third leg extends between the first and second legs. The openings have a generally diamond-shape. The first and second legs define a first angle. The first angle is approximately ninety degrees.

In an additional aspect, the preferred invention is directed to a splash bar for mounting to a splash bar hanger in a cooling tower. The splash bar includes a first leg defining a first leg plane, a second leg extending from the first leg and a third leg having an outer surface. The second leg defines a second leg plane and the third leg defining a third leg plane. The third leg extends between the first and second legs. The first, second and third legs are integrally connected at their ends. Openings are defined in the first, second and third legs. The first and second legs define a first angle that is approximately ninety degrees.

In a further aspect, the preferred invention is directed to a splash bar for mounting to a splash bar hanger in a cooling tower. The splash bar includes a first leg, a second leg extending from the first leg and a third leg having an outer surface. The first, second and third legs define a central void. The first, second and third legs also define a longitudinal axis of the splash bar. Openings are defined in the first, second and third legs. The openings each have a diamond-shape. The openings include a first opening and a second opening. The first opening has long corners that define an opening axis. The opening axis extends substantially parallel to the longitudinal axis.

In yet another aspect, the preferred invention is directed to a splash bar for mounting to a splash bar hanger in a cooling tower. The splash bar includes a first leg, a second leg extending from the first leg and a third leg extending from the second leg. The first, second and third legs define a central void. The first, second and third legs also define a longitudinal axis of the splash bar. The first second and third legs further define an outer surface facing away from the central void. The outer surface includes surface features thereon. Openings are defined through the first, second and third legs.

In another aspect, the preferred invention is directed to a splash bar for mounting to a splash bar hanger in a cooling tower. The splash bar has a body defining a closed cross-sectional shape with a plurality of webs defined between openings through the body. The openings expose a hollow inner space within the body. The body has a first end and a second end and defines a longitudinal axis. The plurality of webs includes a first web extending from the first end to the second end. The first web extends at a first angle or a first arc relative to the longitudinal axis such that the first web wraps around the closed shape at least one hundred eighty degrees (180°) between the first and second ends. The openings are positioned on the body such that a line extending parallel to the longitudinal axis through the body between the first and second end traverses at least one of the openings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a bottom perspective view of a splash bar in accordance with a first preferred embodiment of the present invention;

FIG. 1A is a plan view of a representation of a first opening of the splash bar of FIG. 1;

FIG. 2 is a side elevational view of the splash bar of FIG. 1;

FIG. 2A is a magnified front elevational view of the splash bar of FIG. 1;

FIG. 3 is a top plan view of the splash bar of FIG. 1;

FIG. 3A is a magnified cross-sectional view of a portion of a third leg of the splash bar of FIG. 1, taken along line 3A-3A of FIG. 3;

DETAILED DESCRIPTION OF THE INVENTION

Figure 1P:
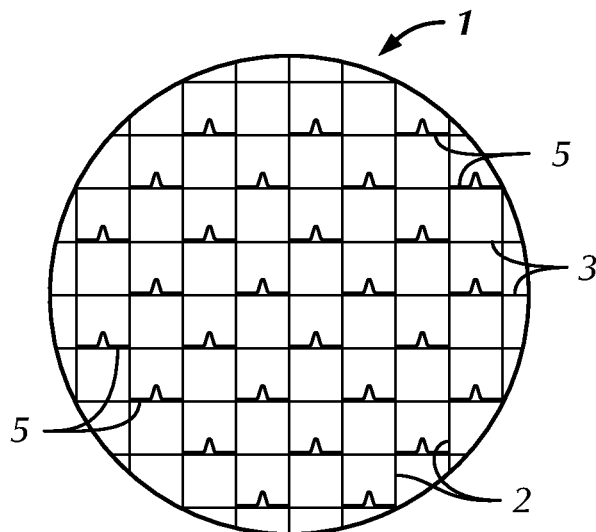
FIG. 1PA is a front elevational view of a prior art hanger grid with assembled splash bars in a four by eight (4×8) arrangement.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the splash bars and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-6, a first preferred splash bar, generally designated 10, may be constructed as an extruded shape having a bar length L, a bar width W and a bar height H. The preferred bar length L is approximately ten inches (10") to approximately eighteen feet (18'), the preferred bar width W is approximately three to five inches (3-5") and the preferred bar height H is approximately one and one-half to three inches (1½-3"), but the bar length, width and height L, W, H are not so limited and may be otherwise designed and configured based on designer preferences, structural requirements, desired performance and other factors. The splash bar 10 is configured for mounting to a splash bar hanger 20 in a cooling tower, preferably with both of first and second ends 18a, 18b of the splash bar 10 supported by opposing splash bar hangers 20 and potentially additional splash bar hangers 20 positioned to support central portions of the splash bar 10 between the first and second ends 18a, 18b. The splash bar hanger 20 is not limited to being constructed of opposing hangers mounted in a cooling tower and may be comprised of nearly any structural support that supports the splash bars 10, such as a bottom support (not shown) upon which the splash bars 10 are stacked such that cooling medium may flow through the stacked splash bars 10 and air may flow through the stacked splash bars 10. The preferred splash bar 10 has a triangular-shaped cross-section, preferably a right isosceles triangle, defining a first leg 14a, a second leg 14*b* and a third leg 14*c*, but is not so limited and may have other sizes and shapes, such as a trapezoidal-shape with four legs (FIG. 7), wherein the parallel legs are generally oriented in the same or a similar manner to the third leg 14*c*, as is described in greater detail below with respect to a second preferred embodiment. The first and second legs 14*a*, 14*b* are connected together and the second and third legs 14*b*, 14*c* are connected together in the first preferred embodiment. The third leg 14*c* extends between ends of the first and second legs 14*a*, 14*b* opposite the intersection of the first and second legs 14*a*, 14*b*. The first and second legs 14*a*, 14*b* are preferably comprised of short legs 14*a*, 14*b* and are connect to each other at a first edge or corner 16. The intersections of the legs 14*a*, 14*b*, 14*c* at the ends of the legs 14*a*, 14*b*, 14*c* are preferably rounded in the preferred embodiment, but are not so limited and may be otherwise arranged and configured, such as being chamfered or defining a relatively sharp edge.

The first leg 14*a* defines a first leg plane 15*a*, the second leg 14*b* defines a second leg plane 15*b* and the third leg 14*c* defines a third leg plane 15*c*, wherein the third leg plane 15*c* is oriented generally parallel to horizontal when installed in the assembled configuration on the splash bar hanger 20. The first, second and third legs 14*a*, 14*b*, 14*c* of the preferred splash bar 10 are integrally connected at their ends and define a closed shape along the splash bar length L. The rounded corners and closed shape of the preferred splash bar 10 limit sharp edges or corners where cooling fluid may accumulate, thereby reducing the potential for formation of streams of cooling fluid flowing downwardly in the cooling tower that can reduce the efficiency of the cooling tower when relatively hot cooling fluid flows in a stream directly into the basin at the bottom of the cooling tower. The rounded corners of the first preferred splash bar 10 also generally promote additional distribution of the cooling medium, preferably water, onto the surfaces of the legs 14*a*, 14*b*, 14*c* and subsequent formation of cooling medium drops of various sizes that facilitate heat transfer between the droplets and air flowing through the assembly. Sharp edges, corners or features are generally not preferred on the splash bars 10, as they can create features where cooling medium fluid accumulates, thereby potentially creating fluid streams that have limited exposure to the air flow in the cooling tower or result in oversized droplet formation. In addition, the orientation of the third leg 14*c*, which is preferably the longest leg when viewed in cross-section (FIG. 4), generally horizontal in the installed configuration preferably facilitates droplet formation of the cooling medium on the surfaces of the third leg 14*c* that subsequently fall onto lower splash bars 10 in the cooling tower or into the bottom basin in the cooling tower.

Figure 2P:
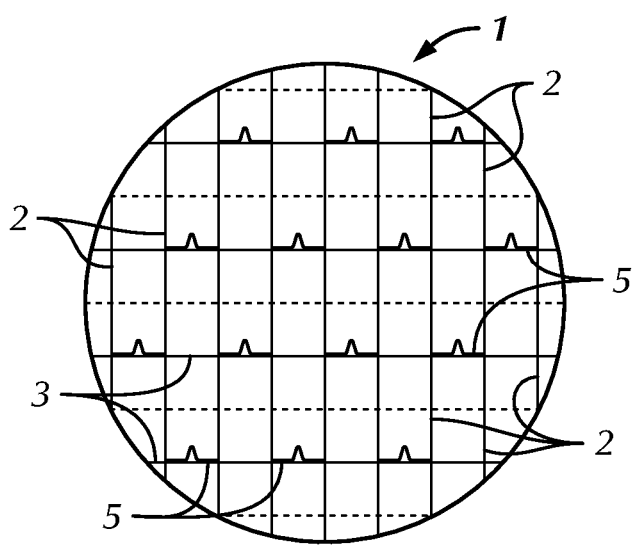
FIG. 2PA is a front elevational view of a prior art hanger grid with assembled splash bars in an eight by eight (8×8) arrangement.
Figure 3P:
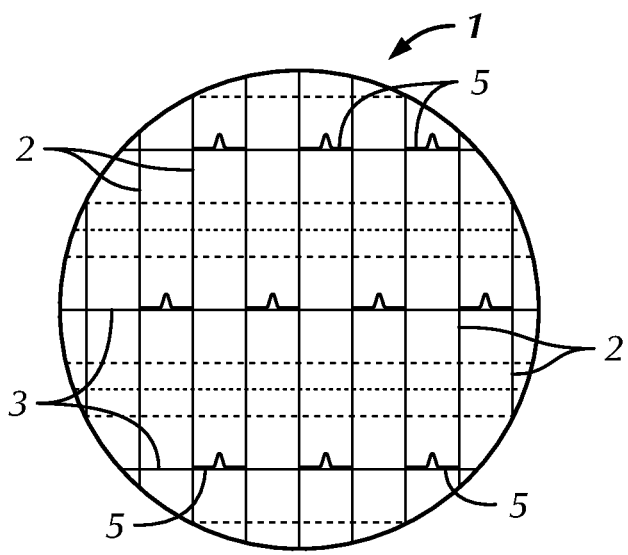
FIG. 3PA is a front elevational view of a prior art hanger grid with assembled splash bars in a twelve by eight (12×8) arrangement.
Figure 3B:
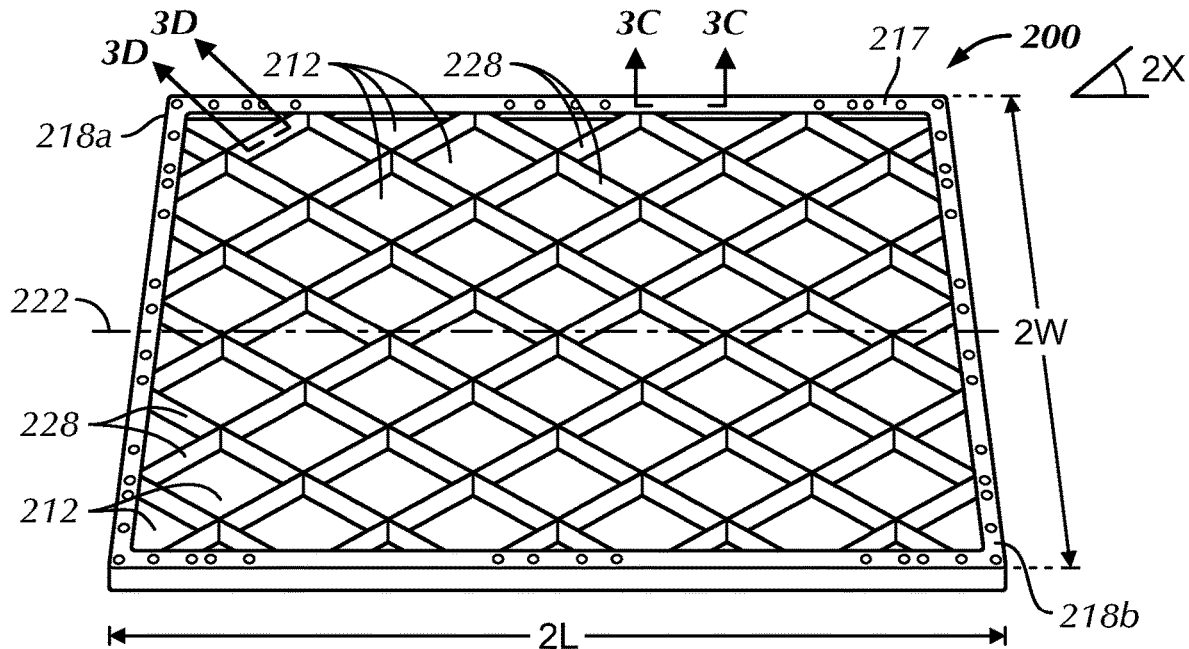
FIG. 3B is a top perspective view of a splash grid in accordance with an alternative preferred embodiment of the present invention, wherein the splash grid includes surface features of the preferred splash bar of FIG. 3.

Referring to FIGS. 2-3A, surface features 50, preferably in the form of grooves or channels on the legs 14*a*, 14*b*, 14*c* and more particularly on the outside surfaces of the legs 14*a*, 14*b*, 14*c*, also facilitate relatively small droplet formation or drive droplet formation and adherence of the cooling medium to the outside surfaces of the legs 14*a*, 14*b*, 14*c* that improve tower efficiency, as is described in greater detail below. The surface features 50 are also preferably designed and configured to promote formation of cooling medium jets that flow relatively horizontally when a droplet impacts the outside surfaces of the legs 14*a*, 14*b*, 14*c*. Droplet formation from the third leg 14*c* is preferred to increase efficiency of the splash bar assembly (FIG. 6) in the cooling tower, as well as from the first and second legs 14*a*, 14*b*, depending on the orientation of the splash bar 10. The surface features or grooves 50 are preferably formed on the legs 14*a*, 14*b*, 14*c* by an embossing technique, but are not so limited and may be defined during formation of the splash bars 10, by deposition of material onto the outside surfaces or otherwise formed on the splash bars 10. In addition, the surface features 50 are not limited to being defined on the outside surfaces of the preferred splash bars 10 and may be employed and formed on nearly any splash surface of a product that is utilized in a cooling tower to facilitate formation of droplets, cooling medium jets or other features that are desirable for any splash surface of a fill material utilized in a cooling tower. The surface features 50 of the first preferred embodiment are shown as U-shaped grooves 50 that extend substantially perpendicularly relative to the longitudinal axis 22, but are not so limited and may extend at an acute angle relative to the horizontal axis 22 and may be comprised of V-shaped grooves 50, protrusions positioned on the outside surfaces of the legs 14*a*, 14*b*, 14*c* or other features that promote droplet formation and cooling medium jets during use, such as an otherwise roughened or textured outside surface on the legs 14*a*, 14*b*, 14*c*. The surface features 50 are also shown only near the second end 18*b* of the preferred splash bar 10 in FIG. 3 and in the cross-section of FIG. 3A, but are so depicted for clarity, as the surface features 50 are preferably positioned on and incorporated into all of the outer surfaces of the legs 14*a*, 14*b*, 14*c*. In addition, the orientation, size and shape of the surface features 50 are not necessarily consistent on each of the legs 14*a*, 14*b*, 14*c* and may have different orientations, shapes and sizes at different positions on the legs 14*a*, 14*b*, 14*c* based on designer preferences or for performance purposes.

Referring to FIGS. 1-6, when the preferred splash bar 10 is positioned in the cooling tower with the first edge or corner 16 facing downwardly (FIG. 6) toward the cooling basin and the third leg 14*c* oriented relatively horizontally, the cooling medium flows toward and may accumulate at or near the first edge or corner 16. The surface features or grooves 50 near the first edge or corner 16 and generally on the outer surfaces of the first and second legs 14*a*, 14*b* reduce streaming of the cooling medium from the first edge or corner 16 by urging the formation of cooling medium droplets, such as by encouraging relatively small droplet formation at intermediate points defined by the surface features 50. The surface features 50 may also preferably function to generate smaller droplets on the outer surface of the third leg 14*c* when the preferred splash bar 10 is mounted on a prior art hanger grid 1 with the third leg 14*c* positioned on the horizontal beam 3. The surface features 50 may further promote cooling medium jets upon impact of the cooling medium on any of the outer surfaces of the legs 14*a*, 14*b*, 14*c* that travel outwardly in relatively small streams from the outer surfaces at an angle to vertical. The cooling medium jets facilitate heat transfer between the cooling medium and the air flowing through the tower. When the splash bar 10 is oriented with the first corner 16 pointed toward the top of the cooling tower (FIG. 7), the cooling medium typically falls onto and flows on the outer surfaces of the first and second legs 14*a*, 14*b* toward and to side edges 17 of the splash bar 10. The rounded corners of the side edges 17 and the surface features 50 facilitate designer control of surface adhesion of the cooling medium film to the outside surfaces of the legs 14*a*, 14*b*, 14*c*, droplet formation and flow direction of the cooling medium on the outside surfaces of the legs 14*a*, 14*b*, 14*c*. For example, the size of the surface features 50 could facilitate surface adhesion and droplet formation, wherein small in amplitude surface features 50 could promote cooling medium accumulation on the outside surfaces and flooding of the microstructure. Alternatively, relatively large amplitude surface features 50 may define drip points or edges at the outside surfaces that promote cooling medium drips and specifically sized drips. The cooling medium preferably falls onto lower splash bars 10 in the assembly or into the cooling medium basin and redistribution of the cooling medium onto the third leg 14c where additional droplets may form. Further, the surface features 50 on the outer surfaces of the first and second legs 14a, 14b of the sloped upwardly facing surfaces are configured to produce jets of cooling fluid and, therefore, smaller cooling medium or fluid droplets that improve the efficiency of the cooling tower. The surface features 50 are also preferably configured to direct the cooling medium downwardly and laterally. The droplets are specifically directed laterally from the surface features 50 when a drop hits the surface features 50 on the outside surfaces of the legs 14a, 14b, 14c and the impact and pressure of the droplet on the surface features 50 results in lateral flow or movement and lateral jets of cooling medium emanating from the point of impact of the droplet.

The closed cross-section of the preferred splash bars 10 provides a central opening or central void defined between the first, second and third legs 14a, 14b, 14c where cooling fluid droplets preferably fall through air flowing through the cooling tower to exchange heat from the droplets into the air. Heat is also preferably exchanged between droplets that fall within the cooling tower with the air flowing through the cooling tower and, to a lesser extent, a film of cooling fluid on the surfaces of the legs 14a, 14b, 14c. These mechanisms provide exposure of the cooling fluid to the flowing air and heat exchange between the cooling fluid and the air. The closed cross-sectional shape of the preferred legs 14a, 14b, 14c also preferably facilitates side-by-side stacking of the splash bars 10 for transport, while prior art bars may be constructed of disparate parts assembled together before installation. These assembled prior art bars have reduced stiffness and limited structural integrity resulting in sagging, pooling of cooling fluid at low points or areas on the splash bars and reduction of efficiency of the cooling tower. The central void or opening of the preferred splash bar 10 is also defined in alternative embodiments of the splash bar 10, such as a splash bar 10' having a trapezoidal-shaped cross-section (FIG. 7) with four legs and the central void or opening, wherein the parallel legs are preferably oriented generally parallel to horizontal in the installed configuration.

The closed shape cross-section of the preferred splash bars 10, preferably in the shape of an isosceles triangle or having a trapezoid-shape, also results in a comparatively stiff and strong splash bar 10 relative to sheet-type splash bars or the prior art splash bars that are assembled into a shape. The preferred closed-shape splash bars 10 may span greater lengths between supports in a cooling tower because of their increased strength and stiffness and/or structural efficiency. The greater widths and closed, relatively stiff cross-sectional shape of the preferred splash bars 10 facilitate designs where not as many splash bars 10 are required for assembly into the cooling tower and not as many supports or hanger grids are required in the cooling towers. The preferred closed-shape splash bars 10 are also comparatively simple and efficient to install into the cooling tower when utilized with the diamond-shaped splash bar hanger 20 and conventional splash bar hangers 1, as the splash bars 10 are urged into the individual opposing slots by a technician without requiring alignment of edge slots to accommodate vertical hanger grid wires 2 of the prior art splash bar systems and assemblies. The prior art splash bars 5 without the preferred closed shape of the splash bars 10 sag and bend under typical spans and cooling medium (water) loading to a greater extent than the preferred splash bars 10, such that the cooling medium tends to pool near a mid-span of the prior art splash bars 5 because of their reduced stiffness. The prior art splash bars 5 may also buckle or fold as a result of their reduced structural capacity, structural efficiency and require additional hanger grids 1 for support, thereby increasing costs and complicating installations. The preferred closed shapes of the splash bars 10 increase stiffness and structural integrity and/or structural efficiency, reduce sag and reduce pooling of cooling medium near the mid-span of the splash bars 10 in the assembled configuration. The preferred splash bars 10 may be installed on splash bar hangers 20 that are spaced at greater distances from each other because of the greater strength, stiffness and structural efficiency of the preferred splash bars 10. The greater distances result in simplification of the assemblies, easier installation and cost reductions in materials and labor. The preferred splash bars 10 also facilitate construction with a wider variety of materials, such as high density polyethylene (HDPE), wherein prior art bars are typically constructed of polyvinyl chloride (PVC) or metallic materials.

Figure 7:
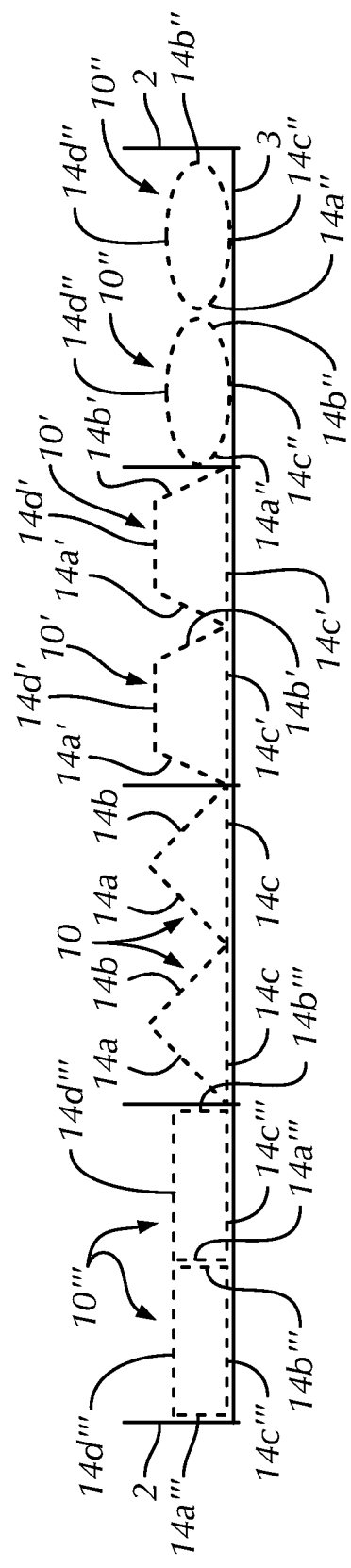
FIG. 7 is a front elevational view of a plurality of preferred splash bars mounted to a splash bar hanger, including two of the splash bars of FIG. 1, as well as pairs of second, third and fourth preferred splash bars.

The preferred splash bars 10 may also be installed in the prior art hanger grids 1 (FIGS. 1PA-3PA), with the third leg 14c positioned on the horizontal beam 3 and the first edge or corner 16 spaced from the horizontal beam 3 (FIG. 7). Cooling medium droplets preferably form and fall from the surface of the third leg 14c opposite the closed space between the legs 14a, 14b, 14c in this orientation when mounted in the prior art hanger grid 1 or on a hanger grid having a similar style to the prior art hanger grid 1. The preferred right isosceles triangle closed shape splash bars 10 with surface features 50 to enhance droplet formation and cooling medium horizontal or lateral jets and diamond-shaped openings 12, which are described in greater detail below, improve performance of the cooling tower that incorporates an assembly of the preferred splash bars 10. These features in combination and individually are designed and configured to improve performance and efficiency of the cooling tower.

Referring to FIGS. 1-6, in the first preferred installed configuration, the third leg 14c is oriented generally horizontally and is positioned closer to a top of the cooling tower than the first edge or corner 16. In this first preferred installed configuration, the outside surface of the third leg 14c is a primary splash surface where droplets impact the splash bar 10 from the cooling medium distribution system above the installed splash bars 10 or from splash bars 10 above the respective third leg 14c. The first and second legs 14a, 14b act as surfaces for development of droplets that subsequently fall onto lower splash bars 10 or into the basin at the bottom of the cooling tower. In contrast, when the splash bar 10 is installed in the prior art hanger grid 1 with the third leg 14c positioned on the horizontal beams 3 or in a hanger grid having a similar horizontal beam 3 and vertical suspension member 2 style (FIG. 7), the first and second legs 14a, 14b function as the primary splash surface where droplets impact the splash bar 10 from the cooling medium distribution system above the installed splash bars 10 or from splash bars 10 above the respective first and second legs 14a, 14b. The third leg 14c functions as the surface for development of droplets that subsequently fall onto lower splash bars 10 or into the basin at the bottom of the cooling tower when the preferred splash bars 10 are mounted in the prior art hanger grid 1.

Referring to FIGS. 1-6, in the first preferred embodiment, the first, second and third planes 15a, 15b, 15c define an isosceles triangle, preferably a right isosceles triangle. The first and second legs 14a, 14b define a first angle A that is preferably, approximately ninety degrees (90°). In addition, the first leg 14a and the third leg 14c define a first acute angle Θ and the second leg 14a and the third leg 14c define a second acute angle Ω. In the first preferred embodiment, the first and second acute angles Θ, Ω are approximately forty-five degrees (45°), but are not so limited and may be comprised of nearly any acute angle between approximately thirty and sixty degrees (30-60°). The preferred triangular-shaped cross-section of the splash bar 10 is an isosceles triangle, preferably a right isosceles triangle, and has a relatively consistent or constant cross-section along the bar length L between the first and second ends 18a, 18b, but is not so limited and may be otherwise designed and configured to have a variable cross-section along the bar length L and to have different cross-sections between ends 18 of the splash bar 10. The first angle A is not limited to being ninety degrees (90°) and may be approximately seventy to one hundred ten degrees (70-110°) with the preferred sum of the first angle A and the first and second acute angles Θ, Ω being one hundred eighty degrees (180°) when the closed shape of the splash bar 10 is a triangle, although the closed shape is not so limited.

The splash bar 10 preferably includes the first end 18a and the second end 18b and the first and second ends 18a, 18b may particularly have a different cross-section than a central portion of the splash bar 10 to facilitate engagement of the ends 18 with the splash bar hanger 20. The splash bar 10 is also preferably substantially hollow, wherein the first leg 14a has a first thickness $t_1$, the second leg 14b has a second thickness $t_2$ and the third leg 14c has a third thickness $t_3$. The preferred first, second and third thicknesses $t_1$, $t_2$, $t_3$ are substantially the same in the first preferred embodiment, but are not so limited and may be variable along the lengths and/or widths of the first, second and third legs 14a, 14b, 14c or each of the legs 14a, 14b, 14c may have different thicknesses $t_1$, $t_2$, $t_3$ relative to each other for performance, structural, aesthetic or other purposes. The first, second and third thicknesses $t_1$, $t_2$, $t_3$ are approximately fifty thousandths of an inch (0.050") in the preferred embodiment.

The splash bar 10 preferably includes openings 12 in at least the third leg 14c or through an outer surface of the splash bar 10. The outer surface of the third leg 14c faces away from a closed or hollow inner space 15 defined by the first, second and third legs 14a, 14b, 14c. The openings 12 are relatively evenly distributed on the first, second and third legs 14a, 14b, 14c in the first preferred embodiment, but are not so limited and may be unevenly spaced, have various sizes and shapes and extend through only portions or select ones of the first, second and third legs 14a, 14b, 14c. The openings 12 may be formed by various methods or processes, but are preferably defined by the forming process of the splash bar 10, such as by an extrusion process. The splash bar 10 may be extruded to have a relatively consistent solid profile or cross-section along its length L and the openings 12 are formed in the third leg 14c, as well as the first and second legs 14a, 14b, to define the openings 12 as the splash bar 10 is formed. The openings 12 may alternatively be defined by punching the openings 12 into the splash bar 10 after initial formation of the splash bar 10. In the preferred extrusion process for constructing the first preferred splash bar 10, a rotating die head may wrap an extruded member around longitudinal members in contact with a mandrel or counter rotating heads may be utilized to form the splash bar 10. The splash bar 10 produced with this variety of extrusion method may have additional arcing or rounding at its corners, although scrap and recycled material is minimal. The splash bars 10 may alternatively be constructed by slitting through and expanding the legs 14a, 14b, 14c to define the openings 12. The openings 12 may have various sizes and shapes, such as diamonds (FIGS. 1-3 and 5A), circles, squares, or arcuate shapes, but are not so limited and may have nearly any size and shape that facilitate the preferred functioning of the splash bars 10 that are able to withstand the normal operating conditions of the splash bars 10 and take on the preferred sizes of the openings 12. The openings 12 may be punctured, cut through or formed in the first, second and third legs 14a, 14b, 14c of the splash bars 10 and are preferably formed in a repeating pattern along the legs 14a, 14b, 14c, but are not so limited and may have variable and inconsistent patterns and shapes based on designer preferences, for performance purposes or to facilitate different performance and cooling medium flow or reaction at various portions of the splash bars 10. In the preferred embodiments, the openings 12 have an opening length x and an opening width y, wherein the opening length x is approximately one-half to one inch (½-1") and the opening width y is approximately one-third to one-half inches (½-⅓") in the preferred embodiments, but are not so limited. A preferred configuration for the openings 12 of the first preferred splash bar 10 has a bar length L of approximately fourteen inches (14"), a bar width W of approximately three and three-quarters inches (3¾"), a bar height H of approximately two inches (2"), an opening length x of approximately three quarters of an inch (¾") and an opening width y of approximately three eighths inches (⅜").

The preferred splash bars 10 may be designed and configured with slots (not shown) in the side edges 17 that receive the vertical suspension members 2 in the installed configuration when the splash bars 10 are mounted in the prior art hanger 1 with the third leg 14c adjacent the horizontal beams 3. The preferred splash bars 10 are not limited to inclusion of the slots or to inclusion of slots that are generally sized and shaped similarly to receive the vertical suspension members 2 and may be comprised of alternative features having different shapes and configurations that facilitate mounting the splash bars 10 to the splash bar hangers 20 or the prior art grids 1, such as rectangular slits, slips, ties, adhesives, magnets or other features that are able to perform the preferred functions of the slots to secure the splash bars 10 to the hanger 1. The first edge 16 and the side edges 17 may be relatively solid along their length or may include the slots that are utilized to secure the splash bar 10 to the hanger 1 or may alternatively include clips, ribs, adhesive, slits that extend substantially horizontal to the longitudinal axis 22 or other mechanisms or methods that facilitate engagement between the splash bar 10 and hangers 1, 20 in the mounted configuration. The first edge 16 and side edges 17 may also be configured to facilitate openings 12 therethrough. In one of the preferred processes for constructing the splash bars 10, material punched or cut out of the legs 14a, 14b, 14c of the extruded splash bar 10 is recycled back into the process for additional extrusion, although the openings 12 are preferably formed during processing or formation of the splash bars 10, such as by pulse extrusion.

An alternative preferred method of constructing the openings 12 in the splash bar 10 is through pulse extrusion. This process utilizes particular materials, preferably thermoplastic polymers, such as polypropylene or polyethylene, that can be extruded based on the cycling of an extrusion head position to pulse horizontal members into the splash bars 10. The process also produces particular patterns based on an extrusion rate of approximately one foot per second (1 ft/s) and cycling approximately fourteen (14) times per foot or fourteen (14) times per second. The resulting splash bar 10 preferably has narrow longitudinal members that are "pulled" or extended during production where a puller is used to draw the splash bars 10 over a mandrel and into a water bath. The final shape of webs 28 of the splash bars 10, which are defined between the openings 12, may have a generally hour-glass shape due to the elongation and necking of the webs 28 from the pulling process when the material is not completely solidified. The horizontal members are elongated in the extrusion direction because of the opening and closing of the pulse plate used to create the lateral members where they are shaped like an oval with tapered points on entrance and exit from the pulsing die. The splash bar 10 may be constructed utilizing this construction method having a bar width W of approximately three to five inches (3-5"), more preferably three and one-half inches (3.5") and a bar height H of approximately one to two and one-half inches (1-2½"), more preferably one and three-quarters inches (1.75"). The pulse extrusion method facilitates production of splash bars 10 that preferably have relatively consistent first, second and third thicknesses $t_1$, $t_2$, $t_3$ between the individual legs 14a, 14b, 14c, but may produce splash bars 10 having different thicknesses $t_1$, $t_2$, $t_3$ that facilitate functioning of the splash bars 10 having different spans to extend between variously spaced hanger grids 1, 20 for various applications and cooling towers. For example, a first preferred splash bar 10 having a bar width W of three and one-half inches (3.5") may have a greater thickness $t_1$, $t_2$, $t_3$ than a preferred splash bar 10 having a bar width W of four inches (4") and the three and one-half inch (3.5") bar width W splash bar 10 has a greater length L to span a greater distance in the cooling tower such that this splash bar 10 is able to carry the required structural load across the greater length L.

The splash bars 10 are preferably constructed of a polymeric or composite material that is able to take on the general size and shape of the preferred splash bars 10, withstand the normal operating conditions of the splash bars 10 and perform the preferred functions of the splash bars 10. The splash bars 10 of the preferred embodiments may specifically be constructed of machined, formed or molded metallic materials. The splash bars 10 of the preferred embodiments may also be constructed of polymeric materials, such as high density polyethylene ("HDPE"), low density polyethylene ("LDPE"), polyvinyl chloride ("PVC"), polypropylene or other related materials.

The openings 12 of the preferred splash bars 10 have a generally diamond-shape. The preferred diamond-shape is slightly oblong with long corners 13a extending generally parallel to a longitudinal axis 22 of the splash bar 10 and narrow corners 13b extending generally perpendicular to the longitudinal axis 22. Referring to FIG. 1A, a representation of a first diamond-shaped opening 12a includes the long corners 13a that define an opening axis 24. The opening axis 24 extends generally parallel to the longitudinal axis 22. The first opening 12a may be positioned on any of the first, second and third legs 14a, 14b, 14c and is generically shown to represent any of the plurality of openings 12 of the preferred splash bar 10. The narrow corners 13b are separated or extend generally perpendicularly relative to the opening axis 24 and the longitudinal axis 22 in the preferred embodiment, but are not so limited and may be otherwise designed and configured. The openings 12 are not limited to diamond-shapes and may take on nearly any size and shape that may be incorporated into the splash bars 10, withstand the normal operating conditions of the splash bars 10 and perform the preferred functions of the openings 12, as is described herein. The openings 12 may, for example, have circular, oval, square, rectangular or other shapes and sizes and may comprise multiple sizes and shapes in the splash bars 10 based on designer preferences, manufacturability or other factors.

The diamond-shaped openings 12 of the preferred splash bars 10 are arranged in a grid pattern and are consistently spaced, such that the relatively consistently sized webs 28 are defined between adjacent openings 12. The webs 28 preferably extend at an acute web angle X relative to the longitudinal axis 22 and extend generally continuously at the acute web angle X to define structural supports positioned at the acute web angle X relative to the longitudinal axis 22. The preferred grid patterns of the openings 12 result in four substantially consistently sized webs 28 defined along each edge of the individual diamond-shaped openings 12. These relatively consistently sized webs 28 result in relatively consistent adherence of cooling medium, preferably water, on the surfaces of the webs 28. Consistent adherence of the cooling medium and formation of a relatively consistent film on the surfaces of the splash bars 10 enhances heat transfer from the cooling medium, particularly when compared to prior art splash bars 5 where the cooling medium may pool on comparatively larger uninterrupted surfaces that are defined on the prior art splash bars 5. These consistent webs 28 also facilitate consistent formation of droplets on the webs 28, as opposed to pooling and formation of streams on the prior art splash bars. Such prior art splash bars may include round openings where inconsistently sized structures are defined between the openings, which results in inconsistent filming or pooling of cooling medium on the surfaces of the prior art splash bar. The orientation of the webs 28 at the acute web angle X relative to the longitudinal axis 22 also impedes the flow of cooling medium, preferably water, in a stream toward an outlet end of the cooling tower under forced air that flows through the assembled and installed splash bars 10. The prior art bars 5 have generally straight and flat surfaces that extend along a longitudinal axis of the prior art splash bars 5 providing an uninterrupted surface for flow of the water beyond a distal end of the splash bars 5 at the outlet end of the bars 5 and drift of the water away from the installed bars 5. This drift of cooling medium out of the fill assembly reduces the efficiency of the cooling tower.

The orientation of the webs 28 at the acute web angle X diverts the cooling medium from flowing in a direct flow path toward the distal ends of the splash bars 10 toward the fill outlet in the assembled configuration. The cooling medium on the splash bars 10 is urged toward the distal ends of the splash bars 10 under the force of cooling air that typically flows from the proximal end toward the distal end of the splash bars 10. The prior art splash bars 5 do not include diversions or features that direct the cooling medium away from direct flow on the splash bar surfaces in the direction of the longitudinal axis. In contrast, the preferred splash bars 10 arrange the webs 28 at the acute web angle X so that the cooling medium is blocked from direct flow in the direction of the longitudinal axis 22 under the force of the forced air. The cooling medium is blocked by the openings 12 from such direct flow toward the distal end, therefore, the orientation of the webs 28 and the diamond-shape of the openings 12 reduce drift of the cooling medium toward the distal ends and out of the cooling tower fill. The preferred splash bars 18 are, therefore, able to direct more cooling medium droplets or additional volume of cooling medium onto lower splash bars 10, thereby improving the efficiency of the cooling tower.

In the preferred embodiments, the webs 28 have a web width between the openings 12 of approximately one-eighth to seven sixteenths of an inch (1/8"-7/16") and include the surfaces features 50 thereon. The webs 28 with the preferred web widths facilitate the formation of cooling medium jets and droplet formation when the droplets, which could be approximately three-eighths inches (3/8") in horizontal width directly impact the webs 28. The webs width is preferably wide enough to prevent a droplet from by passing the webs while falling past the web and small enough to limit significant surface adhesion of the cooling medium to the splash bar 10 during operation.

Referring to FIGS. 1-6, in the first preferred embodiment, the splash bar 10 is constructed as an extrusion and is slit in a pattern acceptable for expansion into an expanded extrusion forming the openings 12, which are preferably formed as the diamond-shaped openings 12. The extrusion process for constructing the preferred splash bars 10 with the openings 12 in the preferred pattern has a yield of nearly one hundred percent (100%), as a result of no recycling of the cutout material. The slitting process is preferably performed on a size-based staged "diameter" mandrel. Partial cooling is accomplished to reduce the temperature of the melt to a temperature that gives the extrusion of the splash bar 10 relatively higher tensile strength, so the material can be pulled though the extrusion process. A mechanism to slit the extrusion in a pattern is placed after the starting diameter on the mandrel. The slit material is pulled over the larger diameter mandrel in a state resembling a thermoformable material at or near the thermoforming temperature of the material being extruded. This expands the slits in the material mechanically to approximate a preferred, expanded metal diamond-shaped configuration of the openings 12. Since the mandrel is preferably smooth, continuous, and relatively flat in the radial direction, the expanded plastic part resembles a flattened expanded metal product in that the members are substantially flat. These members are not rotated based on the typical manufacturing process of partial shearing and extending of the expanded metal products.

Referring to FIGS. 1-3A, the extrusion of the splash bar 10 is preferably embossed with the surface features 50 or a texture on the surface that may be comprised of grooves (not shown) passing laterally across the extrusion and, ultimately, the legs 14a, 14b, 14c and the webs 28. The surface features or grooves 50 can have nearly any shape that does not produce an undercut that can be embossed into the surfaces of the legs 14a, 14b, 14c and webs 28, such as "V", "U" or other shapes. The addition of the grooves or surface features 50 into the external surfaces of the legs 14a, 14b, 14c and webs 28 may operate to increase the water pressure of the drops of water or other cooling medium at the surfaces as the drops of cooling medium impact the splash bar 10. The resulting jet of water or other cooling medium inherently breaks into small droplets of a diameter of some dimension larger than the jet based on the surface tension of the water or other cooling medium. The droplets of water or cooling medium formed from a jet are typically slightly larger than the diameter of the jet and are a result of the surface tension of the water exerting a force on the surface to minimize its surface area. The surface features 50 may also be utilized to direct water flow on the surfaces of the preferred splash bars 10 in preferred directions, such as generally perpendicular to the longitudinal axis 22 or at an angle relative to the longitudinal axis 22, so that the cooling medium is prevented from flowing directly in the direction of the longitudinal axis 22, which could result in the cooling medium flowing or being urged by flowing air toward the rear end or distal end of the splash bars 10 in the cooling tower. The surface features 50, therefore, can be configured and arranged to limit drift of the cooling medium, similar to the orientation of the webs 28 and diamond-shaped openings 12, as is described above, to drain cooling medium from the outside surfaces of the splash bars 10, promote or discourage adhesion of the cooling medium to the outside surfaces, promote cooling medium droplet formation of various sizes and otherwise manipulate the cooling medium as it moves from the top of the cooling tower and ultimately into the basin. The combination of the surface features 50 and the orientation of the webs 28 improves thermal performance of the splash bars 10. In addition, the surface features 50 and the orientation of the webs 28 individually and independently improve thermal performance of the splash bars 10 and the cooling tower that incorporates assemblies of the splash bars 10.

Figure 3C:
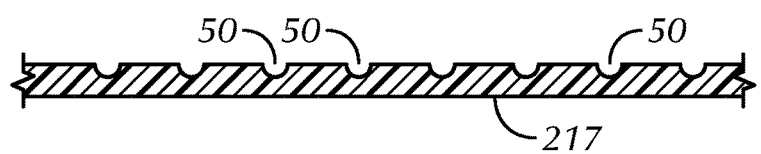
FIG. 3C is a magnified cross-sectional view of a portion of a side edge of the splash grid of FIG. 3B, taken along line 3C-3C of FIG. 3B.
Figure 3D:
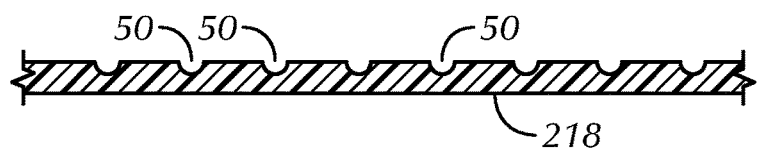
FIG. 3D is a magnified cross-sectional view of a portion of a web of the splash grid of FIG. 3B, taken along line 3D-3D of FIG. 3B.
Figure 4:
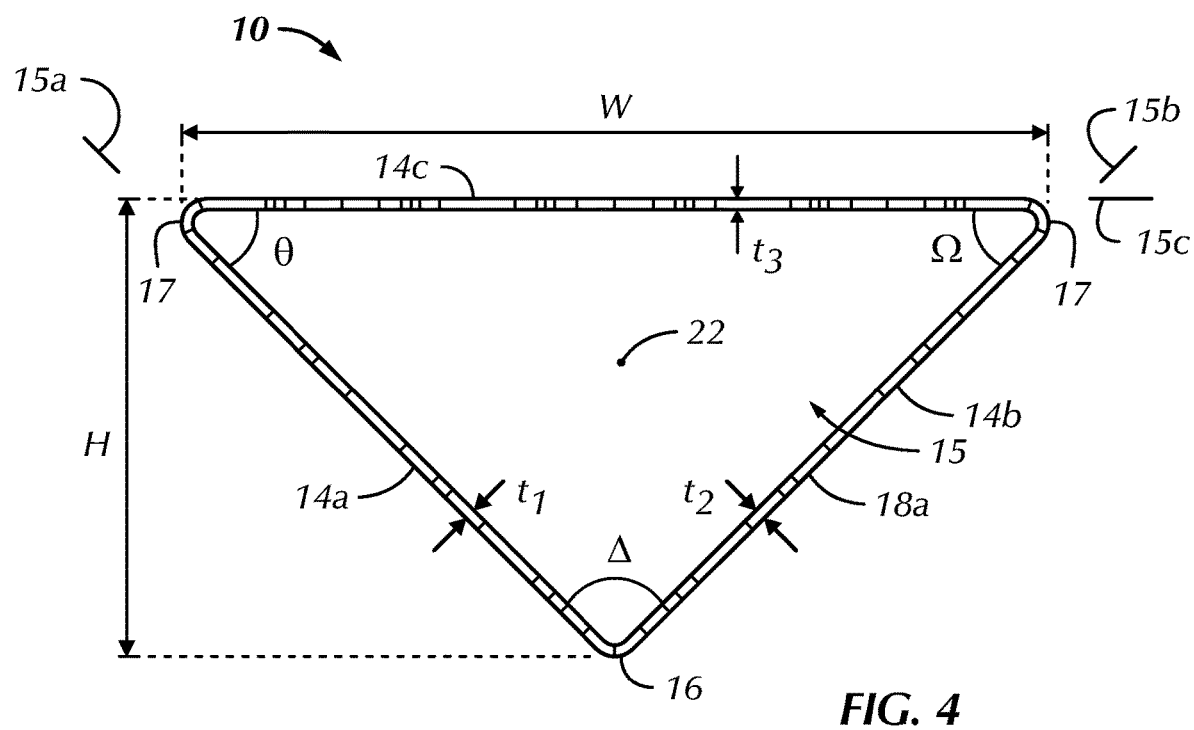
FIG. 4 is a magnified front elevational view of the splash bar of FIG. 1.
Figure 5:
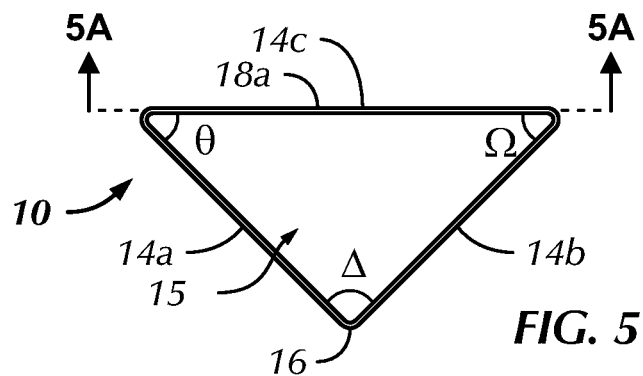
FIG. 5 is an alternative front elevational view of the splash bar of FIG. 1.
Figure 5A:
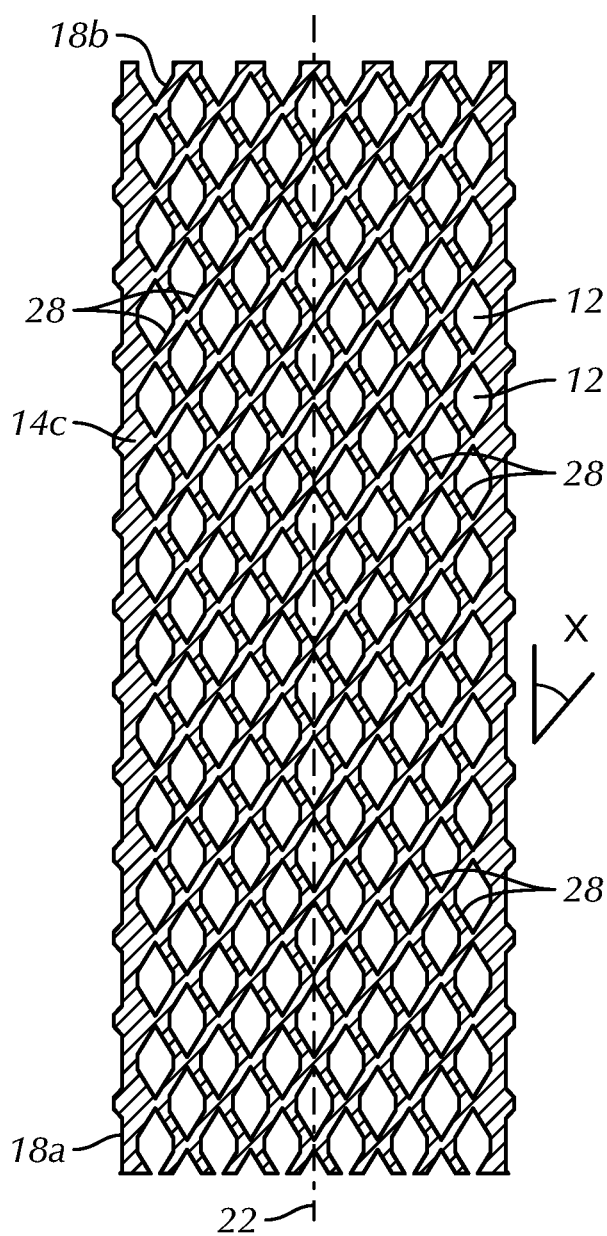
FIG. 5A is a cross-sectional view of the splash bar of FIG. 5, taken along line 5A-5A of FIG. 5.

Referring to FIGS. 3-3D, the preferred surface features 50 may be incorporated into an alternative preferred splash grid 200, which has similar features to the preferred splash bars 10, except the splash grid 200 is generally formed in the shape of a planar sheet or panel without the closed hollow internal space. The alternative preferred splash grid 200 also generally spans a greater width in the cooling tower compared to the preferred splash bars 10. The splash grid 200 of the alternative preferred embodiment has similar features when compared to the first preferred splash bar 10 and like reference numerals are utilized to identify and describe like features with a number two ("2") prefix utilized to distinguish the alternative preferred splash grid 200 to distinguish the alternative preferred splash grid 200 from the first preferred splash bar 10. Except for the described differences, the alternative preferred splash grid 200 otherwise generally operates similarly relative to the first preferred splash bar 10.

The alternative preferred splash grid 200 includes the first and second ends 218a, 218b, the preferred generally diamond-shaped openings 212, and the webs 228 that extend at the acute web angle 2X relative to the longitudinal axis 222. The splash grid 200 also preferably includes the side edges 217 that extend generally parallel to the longitudinal axis 222. The alternative preferred splash grid 200 defines a grid length 2L and a grid width 2W, with the grid length 2L preferably being in a range of approximately one to eighteen feet (1-18') and the grid width 2W preferably being in a range of approximately six inches to nine feet (6"-9'), although not so limited. Each of the first and second ends 218a, 218b, the side edges 217 and the webs 228 preferably include, but are not limited to including, the surface features 50 (FIGS. 3C and 3D) that are formed, operate and function substantially the same as the above-described surface features 50. The surface features 50 are not limited to being included on each of the first and second ends 218a, 218b, the side edges 217 and the webs 228 and may be located only on certain ones of these elements of the alternative preferred splash grid 200 or may be included in specific, predetermined locations of the first and second ends 218a, 218b, the webs 228 and the side edges 217 of the splash grid 200. The surface features 50 preferably improve the thermal performance of the splash grids 200 in a similar manner to the operation and function of the surface features 50 on the first preferred splash bars 10, as is described herein. The surface features 50 of the alternative preferred splash grid 200 are shown in FIGS. 3C and 3D and may be comprised of U-shaped channels or a combination of U-shaped and V-shaped channels formed in the side edges 217, the first and second ends 218a, 218b or on the webs 228, but are not so limited and may be otherwise designed and configured, as is described herein.

The generally planar portion of the splash grid 200, including the first and second ends 218a, 218b, the webs 228 and the side edges 217, substantially function as one of the first, second or third legs 14a, 14b, 14c of the preferred splash bars 10. The splash grid 200 is preferably positioned, although not limited, in the cooling tower in a generally horizontal orientation with the cooling medium falling generally perpendicularly relative to the splash grid 200. The splash grid 200 includes outer surfaces on the webs 228, side edges 217 and first and second ends 218a, 218b with the surface features 50 thereon. The surface features 50 preferably extend at least one of at an acute angle and generally perpendicularly relative to the longitudinal axis 222. The surface features 50 are designed and configured to promote droplet and cooling medium jet formation during operation of the cooling tower. The surface features 50 are preferably comprised of grooves in the outer surfaces of the splash grid 200 and the grooves preferably extending laterally across the outer surfaces or generally perpendicular to the longitudinal axis 222 in the alternative preferred embodiment.

Figure 6:
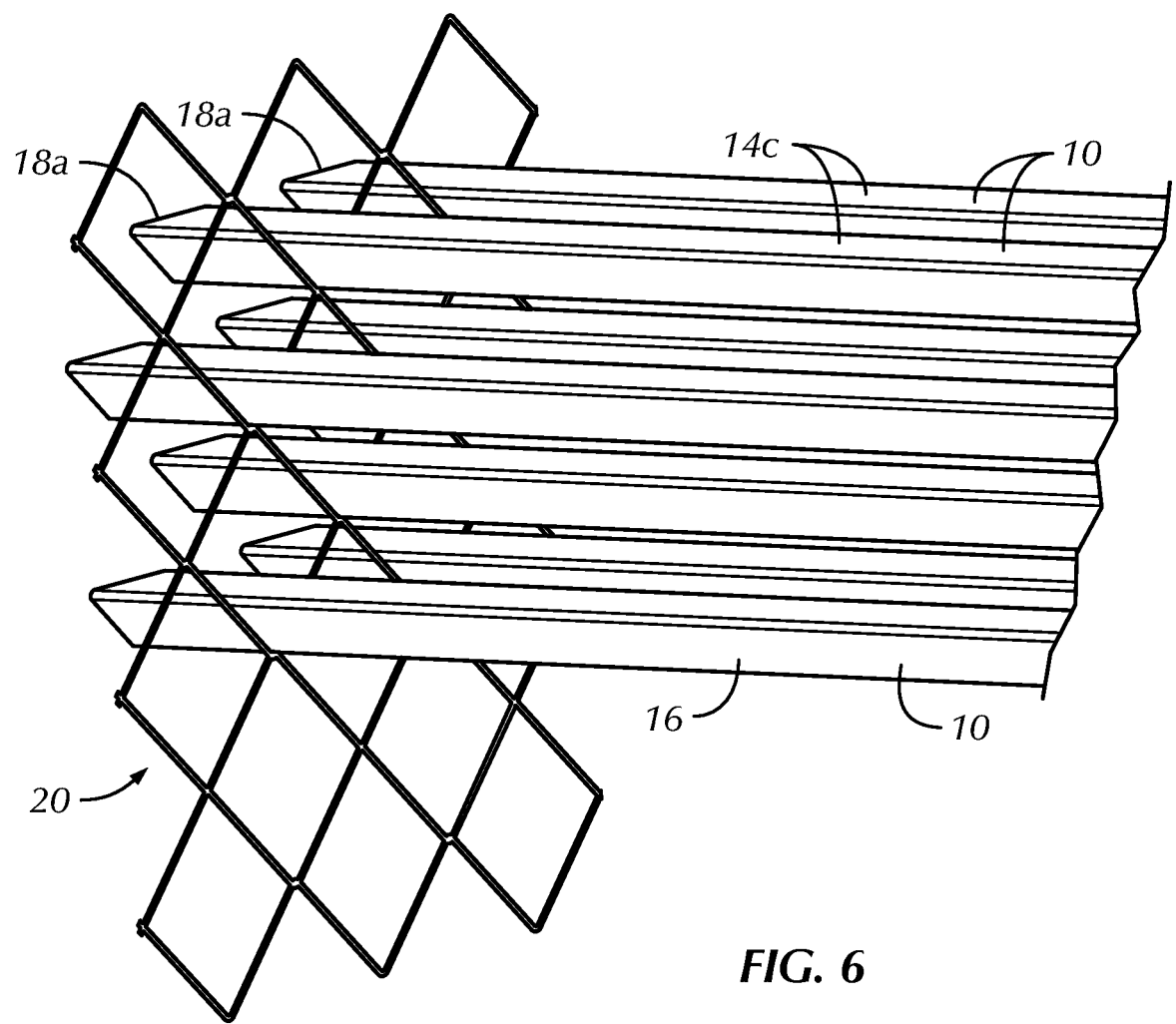
FIG. 6 is a side perspective view of portions of a plurality of the splash bars having a greater length, but similarly configured to the splash bar of FIG. 1, wherein the plurality of splash bars is mounted at one end to a splash bar hanger.

Referring to FIGS. 1-6, when the cooling medium is comprised of water or substantially water, the water naturally adheres to the surfaces of legs 14a, 14b, 14c of the preferred splash bars 10 and droplets and jets of the water are formed during operation of the cooling tower. The accumulated water preferably forms droplets that cling or adhere to low points in the structure of the splash bar 10, at discontinuities or on the larger surfaces where adhesion causes these droplets to form. The formed droplets not yet leaving the splash bar 10 represent a mass of water at some average temperature of the fluid in contact with the splash bar 10. This large droplet, after separating and falling, then has the energy in the form of momentum to impact the outer surface of the third leg 14c or the surfaces of one of the first or second legs 14a, 14b by falling through one of the openings 12 of the splash bar 10, below the splash bar 10 from which the droplet falls. The droplet impacts the lower splash bars 10 and provides resultant jets parallel to the direction of the grooves or surface features 50 that are formed in the surfaces of the legs 14a, 14b, 14c or generally perpendicular to the legs 14a, 14b, 14c where no grooves or surface features 50 are formed. The droplets may also fall through the openings 12 in the splash bars 10 to impact lower splash bars 10 or to fall directly into a collection basin at the bottom of the cooling tower. The larger droplets separate, thereby leaving the bottom, such as from the first edge or corner 16 of the upper splash bars 10 at essentially zero velocity and accelerate to their maximum free fall velocity just prior to impact with the splash bar 10 below the splash bar 10 where the droplet emanates or passes through openings 12 in the lower splash bar 10 and continues to accelerate until the droplet eventually hits an obstacle such as one of the lower splash bars 10, other droplets or the basin (not shown) at the bottom of the cooling tower below the assembled and installed plurality of splash bars 10 (FIG. 6). Limited or insufficient energy of the droplet may cause adhesion of the droplets, water or cooling medium to the surfaces of the splash bars 10 or result in the development of thicker and shorter jets of water or other cooling medium. Smaller droplets adhere to the surfaces of the splash bars 10 and are absorbed into the water film that preferably covers the splash bars 10. The acceleration of the droplet generated from the bottom of the splash bar causes these droplets to coalesce with other smaller droplets falling at lower speeds based on the vertical component of smaller droplet velocity. Since the smaller droplets are generated by the jet effect with the surface of the splash bars 10, the smaller droplets have a trajectory that is impacted by both vertical and lateral components or gravity and jetting, respectively.

The drum for the embossing machine that constructs the preferred splash bars 10 may have a texture of cross ribs, V-shaped grooves, U-shaped grooves, square-shaped grooves or other features that may define valleys and peaks on the surfaces of the splash bars 10 with a pattern designed to reduce the size of the drops by generating narrow jets from the impact of droplets on the surfaces of the splash bars 10 and enabling water droplets to form on the mid-span portions of the splash bars 10. These surface features, grooves or droplet reduction features 50 are preferably embossed into the surfaces of the splash bars 10 and are preferably constructed in combination with the slitting or cutting of the openings 12, prior to the slitting or cutting of the openings 12, or after the slitting or cutting of the openings 12 depending upon the method used to emboss and appropriate process conditions of the material to be embossed. Various techniques and methods may be employed to develop the surface features, grooves or droplet reduction features 50 on the surfaces of the splash bars 10, including processes and techniques employed prior to formation of the splash bars 10, during formation of the splash bars 10 and after construction of the splash bars 10. In addition, the surface features, grooves or droplet reduction features 50 are not limited to being uniform on the outside surfaces of the splash bars 10 and may be adapted for specific locations on the outside surfaces, such as different surface features 50 near the first and second ends 18a, 18b and when compared to a central portion of the splash bars 10 or different surface features 50 on the first, second and third legs 14a, 14b, 14c that may be dependent on whether the splash bar 10 is mounted with the third leg 14c oriented downwardly in the cooling tower or is facing generally upwardly in the installed configuration.

The preferred diamond shape of the openings 12 of the splash bar 10 generally increases the chance of falling droplets impacting the splash bars 10 located in a lower portion of the plurality of splash bars 10 in the cooling tower. The prior art splash bars 5 include square or circular openings that enable more droplets to pass through the prior art lower splash bars without impacting an available surface. The preferred diamond shaped openings 12 and closed shape of the splash bars 10 increase the probability of impact due to the narrower nature of the preferred openings 12 at their mid-span for the same percentage open density of the splash bars 10. The larger perimeter for the same cross-sectional area of the preferred diamond-shaped openings 12 provides more member length that can be impacted by falling water or other cooling medium droplets. The preferred diamond-shape of the openings 12 also minimize cooling medium, preferably water, from being pushed directly down the surfaces of the legs 14a, 14b, 14c toward the forced air outlet. The diamond-shape of the openings 12 reduces drift from the droplets back-loading of the splash bars 10 with water and being entrained in the air stream and carried either to the drift eliminators or out of the cooling tower.

Referring to FIGS. 1-7 and, specifically, FIG. 7, the first preferred splash bar 10, a second preferred splash bar 10', a third preferred splash bar 10" and a fourth preferred splash bar 10''' may be mounted in on a hanger grid in a cooling tower, such as a hanger grid having the horizontal and vertical supports 3, 2. The splash bars 10',10",10''' of the second, third and fourth preferred embodiments have similar features when compared to the first preferred splash bar 10 and like reference numerals are utilized to identify and describe like features with a prime symbol (') utilized to distinguish the second preferred embodiment, a double-prime symbol (") utilized to distinguish the third preferred embodiment and a triple-prime symbol (''') used to distinguish the fourth preferred embodiment from the first preferred embodiment. Except for the described differences, the second, third and fourth preferred embodiments of the splash bar 10',10",10''' otherwise operate substantially the same as and preferably include the same or similar features relative to the first preferred splash bar 10. In addition, the first, second and third preferred splash bars 10, 10', 10" may readily be mountable on the splash bar hanger 20 of FIG. 6 and the first, second, third and fourth preferred splash bars 10, 10', 10", 10''' may readily be mounted on a prior art splash bar hanger 1 or any hanger having the vertical suspension members 2 and the horizontal beams 3 for operation in the associated cooling tower.

The second preferred splash bar 10' has the trapezoid-shaped cross-section including the first and second or side legs 14a', 14b' and the third or longer leg 14c', as well as a fourth leg 14d' that is spaced from and oriented generally parallel to the third leg 14c'. The second preferred splash bar 10' includes the diamond-shaped openings (not shown) extending through the legs 14a', 14b', 14c', 14d' and the longitudinal axis (not shown), as well as the surface features 50 on the outer surfaces of the legs 14a', 14b', 14c', 14d'. The second preferred splash bars 10' are mountable in the cooling tower hanger or hanger grids, preferably with the third leg 14c' oriented horizontally or perpendicular relative to the cooling medium flow in through the fill in the cooling tower. The fourth leg, 14d' of the second preferred splash bars 10' is also oriented generally horizontally or perpendicularly to the cooling medium flow when mounted to the cooling tower. The third preferred splash bar 10" has an oval-shaped cross-section with the long sides comprising the third and fourth legs 14c", 14d" and the shorter sides comprising the first and second legs 14a", 14b". The fourth preferred splash bar 10''' has a square-shaped cross-section with the first, second, third and fourth legs 14a''', 14b''', 14c''', 14d''', wherein the third and fourth legs 14c''', 14d''' are preferably oriented generally horizontal or perpendicular to the cooling medium flow direction in the installed configuration. The third and fourth preferred splash bars 10", 10''' also preferably include the diamond-shaped openings and the surface features 50 described herein.

In operation, the first, second, third and fourth preferred splash bars 10, 10', 10", 10''' are positioned in the cooling tower supported by the hanger grid 5, 20, preferably with the third and fourth legs 14c, 14c', 14c", 14c''', 14d', 14d", 14d''' oriented generally perpendicular relative to the cooling medium flow direction. The splash bars 10, 10', 10", 10''' provide enhanced heat exchange between the cooling medium and the air flowing through the fill during operation of the cooling tower by formation of cooling medium drips and jets, as well as film on the outside surfaces of the splash bars 10, 10', 10", 10'''.

Figure 8:
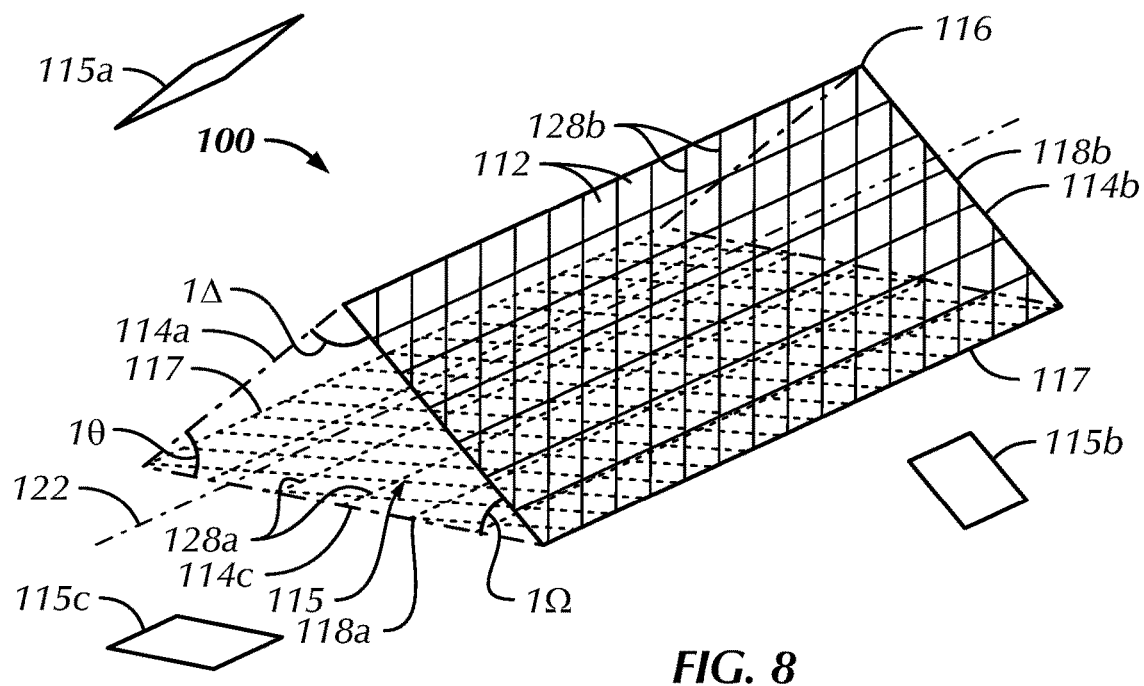
FIG. 8 is a bottom perspective view of a splash bar in accordance with a fifth preferred embodiment of the present invention.
Figure 9:
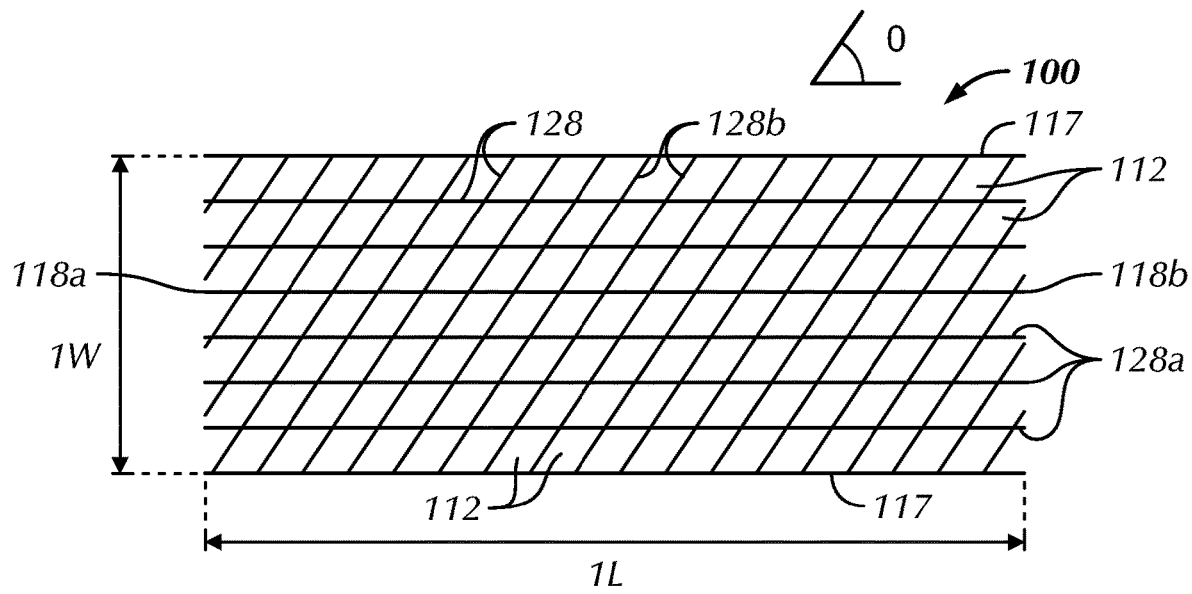
FIG. 9 is a bottom plan view of the splash bar of FIG. 8.

Referring to FIGS. 8 and 9, a fifth preferred splash bar 110 may be mounted on a hanger grid in a cooling tower, such as the preferred hanger grid 20 or a hanger grid having the horizontal and vertical supports 3, 2. The fifth preferred splash bar 110 has similar features when compared to the first, second, third and fourth preferred splash bars 10, 10', 10", 10''' and like reference numerals are utilized to identify and describe like features with a number one ("1") prefix utilized to distinguish the fifth preferred embodiment from the other preferred splash bars 10, 10', 10", 10'''. Except for the described differences, the fifth preferred embodiment of the splash bar 110 otherwise operates substantially the same as and preferably includes the same or similar features relative to the first, second, third and fourth preferred splash bars 10, 10', 10", 10'''.

The fifth preferred splash bar 110 has a comparatively more open design compared to the first preferred splash bar 10, with larger openings 112 and narrower webs 128 between the openings 112. In addition, the webs 128 include longitudinal webs 128a that extend substantially parallel to the longitudinal axis 122 and angled webs 128b that extend at an acute web angle θ relative to the longitudinal axis 122 and the longitudinal webs 128a. The fifth preferred splash bar 110 has a right isosceles triangle cross-section with the first angle 14 between the first and second legs 114a, 114b and the first and second acute angles 1Θ, 1Ω, between the first and third legs 114a, 114c and the second and third legs 114b, 114c, respectively. The fifth preferred splash bar 110 with the preferred right isosceles triangle cross-section facilitates mounting the splash bar 110 in the preferred hanger 20 with the diamond-shaped windows and the prior art hangers, preferably with the third leg 114c oriented generally horizontal in the installed configuration.

Referring to FIGS. 1, 3, 5A and 10-12, sixth, seventh and eighth preferred splash bars 610, 710, 810 may be mounted on a hanger grid in a cooling tower, such as the preferred hanger grid 20 or a hanger grid having the horizontal and vertical supports 3, 2. The sixth, seventh and eighth preferred splash bars 610, 710, 810 have similar features when compared to the first, second, third fourth and fifth preferred splash bars 10, 10', 10", 10''', 110 and like reference numerals are utilized to identify and describe like features with the numbers six, seven and eight ("6," "7," and "8") prefixes utilized to distinguish the sixth, seventh and eighth preferred embodiments from the other preferred splash bars 10, 10', 10", 10''', 110, respectively. Except for the described differences, the sixth, seventh and eighth preferred embodiments of the splash bars 610, 710, 810 otherwise operate substantially the same as and preferably include the same or similar features relative to the first, second, third, fourth and fifth preferred splash bars 10, 10', 10", 10''', 110.

Figure 10:
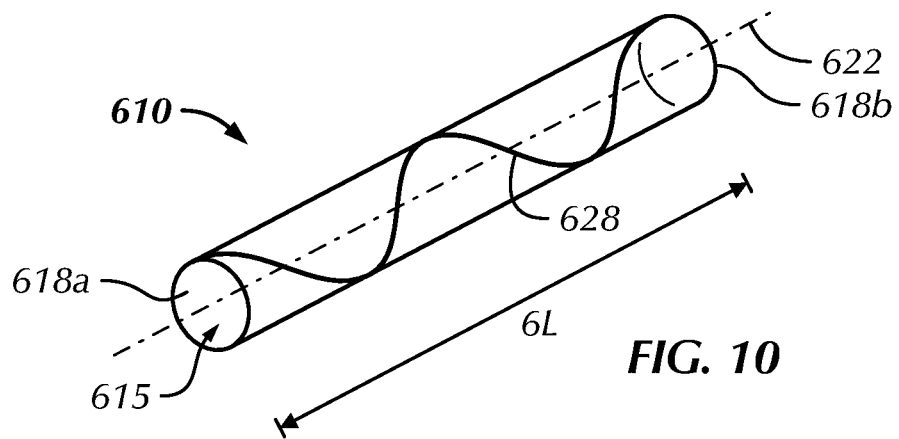
FIG. 10 is a bottom perspective view, wireframe representation of a splash bar in accordance with a sixth preferred embodiment of the present invention, wherein a first web of a plurality of webs of the splash bar is shown and the other plurality of webs are excluded for clarity.
Figure 11:
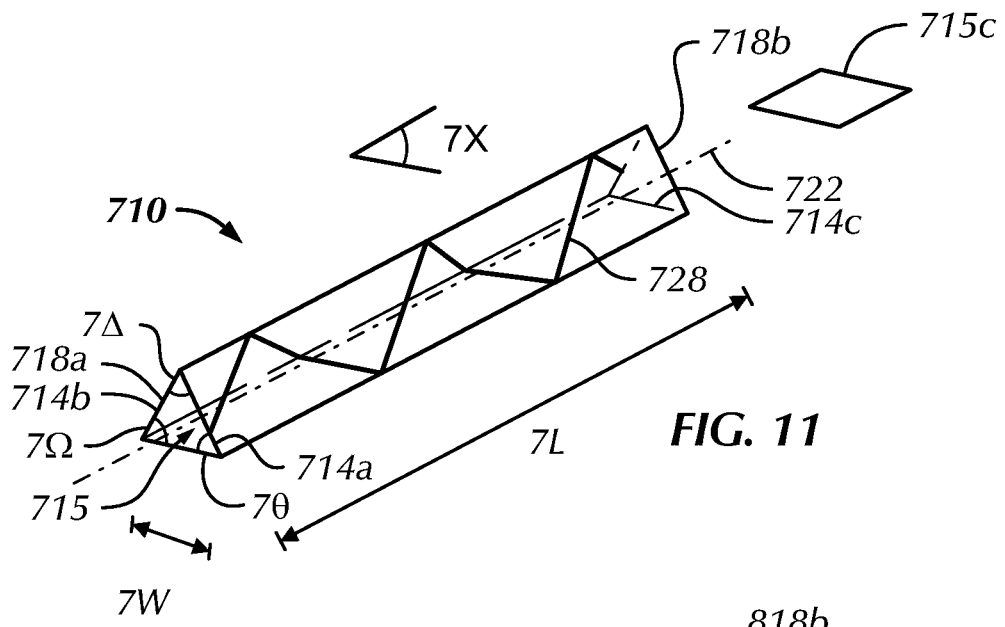
FIG. 11 is a bottom perspective view, wireframe representation of a splash bar in accordance with a seventh preferred embodiment of the present invention, wherein a first web of a plurality of webs of the splash bar is shown and the other plurality of webs are excluded for clarity.
Figure 12:
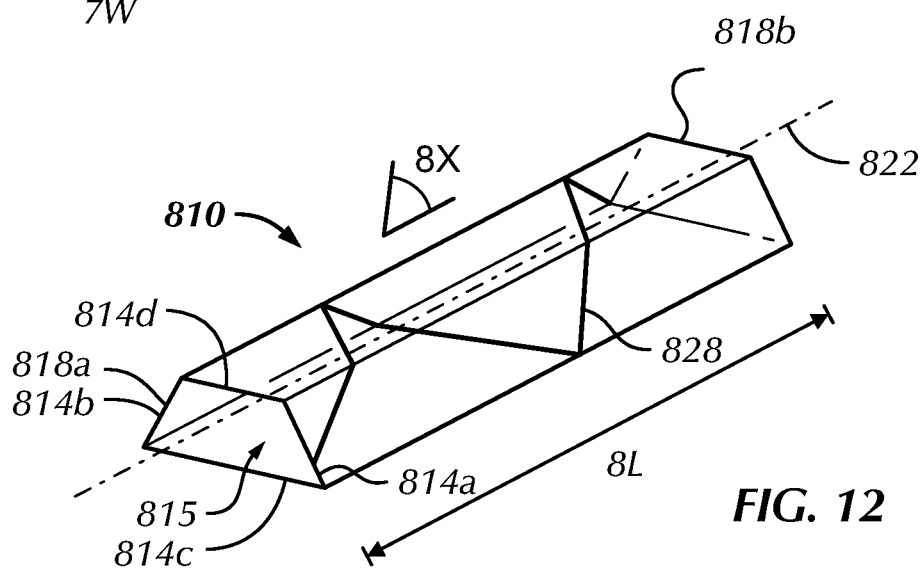
FIG. 12 is a bottom perspective view, wireframe representation of a splash bar in accordance with an eighth preferred embodiment of the present invention, wherein a first web of a plurality of webs of the splash bar is shown and the other plurality of webs are excluded for clarity.

The sixth, seventh and eighth preferred splash bars 610, 710, 810 are shown in FIGS. 10-12 as wireframe representations of the splash bars 610, 710, 810 with only a single web or first web 628, 728, 828 of the plurality of webs extending around the closed shape of the body of the splash bars 610, 710, 810 for clarity, although the preferred splash bars 610, 710, 810 include the plurality of webs 28, as is shown in the first preferred splash bar 10 with the plurality of webs 28 defined between the openings 12. The sixth preferred splash bar 610 has a generally circular cross-section, the seventh preferred splash bar 710 has a generally triangular cross-section and the eighth preferred splash bar 810 has a trapezoid-shaped cross-section with bodies that define a generally closed cross-sectional shape. The sixth, seventh and eighth preferred splash bars 610, 710, 810 are not limited to these cross-sectional shapes and may have nearly any shape that defines the closed cross-sectional shape, is able to take on the general size of the preferred splash bars 610, 710, 810, withstand the normal operating conditions of the preferred splash bars 610, 710, 810 and perform the preferred functions of the splash bars 610, 710, 810, as is described herein. The splash bars 610, 710, 810 are designed and configured for mounting in a cooling tower on the preferred hanger grid 20 or the hanger grid having the horizontal and vertical supports 3, 2.

The sixth, seventh and eighth preferred splash bars 610, 710, 810 include a plurality of webs (not shown) that are defined between openings (not shown) through the body, but FIGS. 10-12 show only the first web 628, 728, 828 extending from the first end 618a, 718a, 818a to the second end 618b, 718b, 818b for clarity and only the first web 628, 728, 828 extending in one direction around the closed cross-sectional shapes of the splash bars 610, 710, 810, while the preferred splash bars 610, 710, 810 preferably have webs that cross each other between the first and second ends 618a, 718a, 818a, 618b, 718b, 818b, as is shown in the first preferred splash bar 10 with the crossing webs 28 defined between adjacent openings 12. The openings expose the hollow inner space 615, 715, 815 within the closed cross-sectional shapes of the body such that cooling medium droplets and jets are able to fall through the openings and the droplets and jets exchange heat with the air flowing through the cooling tower. The bodies of the first, sixth, seventh and eighth preferred splash bars 10, 610, 710, 810 have the first end 18a, 618a, 718a, 818a and the second end 18b, 618b, 718b, 818b and define the longitudinal axis 22, 622, 722, 822. The plurality of webs include a first web 28a, 628, 728, 828 that extends from the first end 18a, 618a, 718a, 818a to the second end 18b, 618b, 718b, 818b. The first web 28a, 628, 728, 828 extends at the acute web angle or a first angle X or a first arc relative to the longitudinal axis 22, 622, 722, 822 such that the first web 28a, 628, 728, 828 wraps around the closed shape of the body at least one hundred eighty degrees (180°) between the first and second ends 18a, 618a, 718a, 818a, 18b, 618b, 718b, 818b. The first webs 28a, 628, 728, 828 may also wrap further around the closed shape of the bodies between the first and second ends 18a, 618a, 718a, 818a, 18b, 618b, 718b, 818b, such as three hundred sixty degrees (360°), generally depending on the bar length L, 6L, 7L, 8L and the orientation of the plurality of webs 28, 28a, 628, 728, 828 relative to the longitudinal axes 22, 622, 722, 822. The bar length L, 6L, 7L, 8L is preferably at least ten inches (10") and may have bar length L, 6L, 7L, 8L preferably between ten inches and eighteen feet (10"-18'). The openings 22 are positioned on the body of the splash bars 10, 610, 710, 810 such that a line extending parallel to the longitudinal axis 22, 622, 722, 822 through the body between the first and second ends 18a, 618a, 718a, 818a, 18b, 618b, 718b, 818b traverses or extends through at least one of the openings. In this preferred configuration, accordingly, no direct linear path along or parallel to the longitudinal axis 22, 622, 722, 822 for flowing cooling medium is defined between the first and second ends 18a, 618a, 718a, 818a, 18b, 618b, 718b, 818b. Any linear path between the first and second ends 18a, 618a, 718a, 818a, 18b, 618b, 718b, 818b is interrupted by at least one of the openings 22, such that cooling medium that may be pushed by air flowing through the cooling tower or along the preferred splash bars 10, 610, 710, 810 does not have a direct surface flow path between the first and second ends 18a, 618a, 718a, 818a, 18b, 618b, 718b, 818b that may result in the cooling medium being blown out of the assembly of splash bars 10, 610, 710, 810 and out of the cooling tower, thereby reducing the efficiency of the cooling tower, which is undesirable.

In the seventh and eighth preferred splash bars 710, 810, the first webs 728, 828 extend at the first acute web angle 7X, 8X relative to the longitudinal axis 722, 822 and in the sixth preferred splash bar 610, the first web 628 extends at an arc relative to the longitudinal axis 622 or in an arcuate path around the closed generally cylindrical shape of the splash bar 610. The sixth, seventh and eighth preferred splash bars 610, 710, 810 also include the additional plurality of webs (not shown) that cross or extend generally parallel to the first webs 628, 728, 828, although the additional webs are not shown for clarity. The additional webs provide further structural integrity for the splash bars 610, 710, 810 and splash surfaces for the cooling medium. The webs 628, 728, 828 may also include the preferred surface features or grooves 50, as are described above.

Referring to FIG. 10, the sixth preferred splash bar 610 may be constructed from an extrusion process that defines the arcuate shape of the first web 628 and the additional plurality of webs (not shown) that extend in an arc around the longitudinal axis 622 to define the body. The first web 628 and the plurality of additional webs are not limited to extending in one direction around the longitudinal axis 622 and may change direction, orientation and arcuate curvature between the first and second ends 618a, 618b. For example, the extrusion process may arc the first and additional plurality of webs 628 in a first arc and orientation and then switch to an opposite orientation and arc after a predetermined length of the splash bar 610 is formed. Alternatively, the webs 628 may be formed in a relatively linear orientation relative to the longitudinal axis 622 and subsequently deformed at an angle or in an arcuate shape relative to the longitudinal axis 622 to define the splash bar 622.

It will be appreciated by those skilled in the art that changes could be made to the preferred embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A splash bar for mounting to a splash bar hanger in a cooling tower, the splash bar comprising:
    a first leg;
    a second leg extending from the first leg;
    a third leg extending from the second leg, the first, second, and third legs defining a central void, the first, second and third legs also defining a longitudinal axis extending between first and second ends of the splash bar; and
    openings defined in the first, second, third legs, the openings each having a diamond-shape, the openings including a first opening and a second opening, the first opening having long corners that define an opening axis, the opening axis extending substantially parallel to the longitudinal axis, the first, second and third legs defined by a plurality of webs including a first web and a second web, wherein the first web wraps around the central void at least three hundred sixty degrees between the first and second ends and defines a first web angle relative to the longitudinal axis, the second web wraps around the closed shape at least three hundred sixty degrees between the first and second ends and defines a second web angle relative to the longitudinal axis, the first web counter wrapping around the longitudinal axis relative to the second web such that the second web is closer to the central void than the first web.

2. The splash bar of claim 1, wherein the first opening includes narrow corners, the narrow corners extend generally perpendicularly relative to the opening axis.

3. The splash bar of claim 1, wherein the first opening has an oblong diamond-shape, the first opening defining an opening axis, the opening axis extending substantially parallel to a longitudinal axis of the splash bar.

4. The splash bar of claim 1, wherein the openings are arranged in a grid pattern and are consistently spaced such that webs are defined between adjacent openings, the webs extending at a web angle relative to the longitudinal axis.

5. The splash bar of claim 4, wherein the web angle is an acute angle.

6. The splash bar of claim 1, wherein the first web defines an outer surface of the splash bar, the second web positioned inwardly relative to the first web toward the longitudinal axis relative to the outer surface.

7. The splash bar of claim 1, further comprising:
a fourth leg connecting the first and third legs, the central void having a trapezoidal-shape.

8. The splash bar of claim 1, wherein the central void is a triangle, the third leg connected to the first and second legs.

9. A splash bar for mounting to a splash bar hanger in a cooling tower, the splash bar comprising:
a body defining a closed cross-sectional shape with a plurality of webs defined between openings through the body, the openings exposing a hollow inner space within the body, the body having a first end and a second end and defining a longitudinal axis, the plurality of webs including a first web and a second web extending from the first end to the second end, the first web extending at a first web angle relative to the longitudinal axis such that the first web wraps around the closed cross-sectional shape at least three hundred sixty degrees (360°) between the first and second ends, the second web extending at a second web angle relative to the longitudinal axis such that the second web wraps around the closed shape at least three hundred sixty degrees (360°) between the first and second ends, the first web angle being opposite the second web angle such that the first and second webs counter rotate around the longitudinal axis, the second web being positioned closer to the hollow inner space than the first web, the openings positioned on the body such that a line extending parallel to the longitudinal axis through the body between the first and second ends traverses at least one of the openings.

10. The splash bar of claim 9, wherein the first web extends at a first acute web angle relative to the longitudinal axis.

11. The splash bar of claim 10, wherein the plurality of webs extend at the first acute web angle relative to the longitudinal axis.

12. The splash bar of claim 9, wherein the openings have a generally diamond-shape.

13. The splash bar of claim 9, wherein the closed cross-sectional shape is a triangle.

14. The splash bar of claim 9, wherein the closed cross-sectional shape is a circle.

15. The splash bar of claim 9, wherein the body has a bar length between the first and second ends, the bar length being at least ten inches (10").

16. The splash bar of claim 9, wherein the closed cross-sectional shape is a trapezoid.

17. The splash bar of claim 9, wherein the closed cross-sectional shape is square-shaped.

18. The splash bar of claim 9, wherein the closed cross-sectional shape is a rectangle.

19. The splash bar of claim 9, wherein the closed cross-sectional shape is an oval.

20. The splash bar of claim 9, wherein the plurality of webs have a web width between the openings of approximately one-eighth to seven sixteenths of an inch.

* * * * *